(12) United States Patent
Goetzinger et al.

(10) Patent No.: US 10,814,833 B1
(45) Date of Patent: Oct. 27, 2020

(54) ANTI-THEFT LICENSE PLATE DISPLAY AND SECURE STORAGE SYSTEM

(71) Applicants: James Goetzinger, Carlsbad, CA (US); Russell Allen, San Diego, CA (US); Michael Koclanes, Johnstown, CO (US); William Brown, Jr., Chandler, AZ (US); Jason Howe, Carlsbad, CA (US)

(72) Inventors: James Goetzinger, Carlsbad, CA (US); Russell Allen, San Diego, CA (US); Michael Koclanes, Johnstown, CO (US); William Brown, Jr., Chandler, AZ (US); Jason Howe, Carlsbad, CA (US)

(*) Notice: Subject to any disclaimer, the term of this patent is extended or adjusted under 35 U.S.C. 154(b) by 184 days.

(21) Appl. No.: 16/168,717

(22) Filed: Oct. 23, 2018

Related U.S. Application Data

(60) Provisional application No. 62/575,969, filed on Oct. 23, 2017.

(51) Int. Cl.
| | |
|---|---|
| *B60R 25/24* | (2013.01) |
| *B60R 13/10* | (2006.01) |
| *E05B 81/72* | (2014.01) |
| *B60R 9/06* | (2006.01) |
| *B60R 25/23* | (2013.01) |
| *B60R 25/34* | (2013.01) |
| *B60R 25/20* | (2013.01) |
| *H04W 4/80* | (2018.01) |

(52) U.S. Cl.
CPC ............. *B60R 25/24* (2013.01); *B60R 9/065* (2013.01); *B60R 13/105* (2013.01); *B60R 25/2018* (2013.01); *B60R 25/23* (2013.01); *B60R 25/34* (2013.01); *E05B 81/72* (2013.01); *B60R 2325/101* (2013.01); *B60R 2325/103* (2013.01); *H04W 4/80* (2018.02)

(58) Field of Classification Search
CPC ....... B60R 25/24; B60R 9/065; B60R 13/105; B60R 25/2018; B60R 25/23; B60R 25/34; E05B 81/72
USPC ........................................................ 340/5.73
See application file for complete search history.

(56) References Cited

U.S. PATENT DOCUMENTS

| | | | |
|---|---|---|---|
| 5,012,602 A | 5/1991 | Storey | |
| 5,503,420 A * | 4/1996 | Consiglio | ............. B60R 13/105 280/288.4 |
| 5,528,998 A * | 6/1996 | Smith | ................. E05B 19/0005 109/29 |

(Continued)

FOREIGN PATENT DOCUMENTS

WO   WO 2016201355   12/2016

*Primary Examiner* — Kerri L McNally
(74) *Attorney, Agent, or Firm* — Advantage IP Law Firm

(57) ABSTRACT

An anti-theft license plate display and secure storage device may be provided by a lockable security vault with a first sensor sensing the presence of a vehicle access component within the vault while a communication interface is operable to transmit vault location and locked status signals along with a vehicle access component presence status signal and receive at least an authenticated unlocking command to unlock the vault allowing a user to retrieve the vehicle access component when stored therein with a beacon also periodically or continuously announcing the vehicle access component presence status outside the vault for receipt by a mobile communication device passing by within a predetermined range.

20 Claims, 26 Drawing Sheets

(56) References Cited

U.S. PATENT DOCUMENTS

| | | | |
|---|---|---|---|
| D396,439 S | 7/1998 | Turnquest | |
| 5,896,685 A | 4/1999 | McCall | |
| 5,947,038 A | 9/1999 | Smith | |
| 5,979,339 A | 11/1999 | Smith | |
| 6,286,238 B1 | 9/2001 | Harrington | |
| 6,305,107 B1 | 10/2001 | Parenti | |
| 6,481,126 B2 | 11/2002 | Paulhill | |
| 6,892,483 B2 | 5/2005 | Parenti | |
| 7,257,912 B2 | 8/2007 | Yang | |
| 7,350,323 B1 | 4/2008 | Basos | |
| 7,415,787 B2 | 8/2008 | Eidsmore | |
| D591,660 S | 5/2009 | Kazaryan | |
| 7,535,343 B1 * | 5/2009 | Pinckney | B60R 13/00 340/425.5 |
| D599,650 S | 9/2009 | Simms | |
| 7,669,443 B2 | 3/2010 | Varner | |
| D623,105 S | 9/2010 | Aneiros | |
| 7,848,704 B2 | 12/2010 | Smith | |
| 7,966,071 B2 | 1/2011 | Downey | |
| 8,695,243 B1 | 4/2014 | Aldasem | |
| 8,965,398 B2 | 2/2015 | Zhu et al. | |
| 9,030,321 B2 | 5/2015 | Breed | |
| 9,033,116 B2 | 5/2015 | Breed | |
| 9,373,201 B2 | 6/2016 | Jeffries et al. | |
| 9,525,968 B2 | 12/2016 | Pounds et al. | |
| 9,624,711 B2 | 4/2017 | McAlexander | |
| 9,652,908 B2 | 5/2017 | Fokkelman | |
| RE46,539 E | 9/2017 | Fisher | |
| 9,767,629 B1 | 9/2017 | Gulati | |
| 9,767,632 B2 | 9/2017 | Johnson | |
| 9,769,658 B2 | 9/2017 | Dolev et al. | |
| 2004/0112099 A1 * | 6/2004 | Randall | E05B 19/0005 70/63 |
| 2005/0087575 A1 * | 4/2005 | Samsel | B62J 9/20 224/413 |
| 2005/0140159 A1 * | 6/2005 | Barber | B60R 11/00 296/37.6 |
| 2005/0278995 A1 | 12/2005 | Parenti | |
| 2006/0230651 A1 | 10/2006 | Eidsmore | |
| 2007/0157495 A1 | 7/2007 | Yang | |
| 2007/0169389 A1 | 7/2007 | Hoffman | |
| 2012/0068492 A1 * | 3/2012 | Lucas | B60R 9/065 296/37.1 |
| 2014/0156111 A1 | 6/2014 | Ehrman | |
| 2014/0309842 A1 | 8/2014 | Jeffries et al. | |
| 2014/0278608 A1 | 9/2014 | Johnson et al. | |
| 2017/0234057 A1 * | 8/2017 | Yardley | E05B 65/0075 109/56 |

\* cited by examiner

DATABASE ELEMENTS — 58

- Unique Vault ID — 160
- Unique Access Code — 162
- Unique Key FOB ID — 164
- Unique USER ID — 166
- User Login ID (username/email, password) — 168
- User Permissions — 170
- User Information — 172
- Vehicle VIN — 174
- License Plate No. — 176
- Vehicle Location (Coordinates) — 178
- Key Location (Coordinates) — 180
- Tamper Status (Alert, No Alert) — 182
- Key Presence in Vault (Present, Not Present) — 184
- Lock Status (Open, Locked) — 186
- Vehicle Owner Info — 188
- Vehicle Mileage — 190
- Bluetooth LE Status — 192
- Beacon Status — 194
- Battery Status — 196

FIG. 15

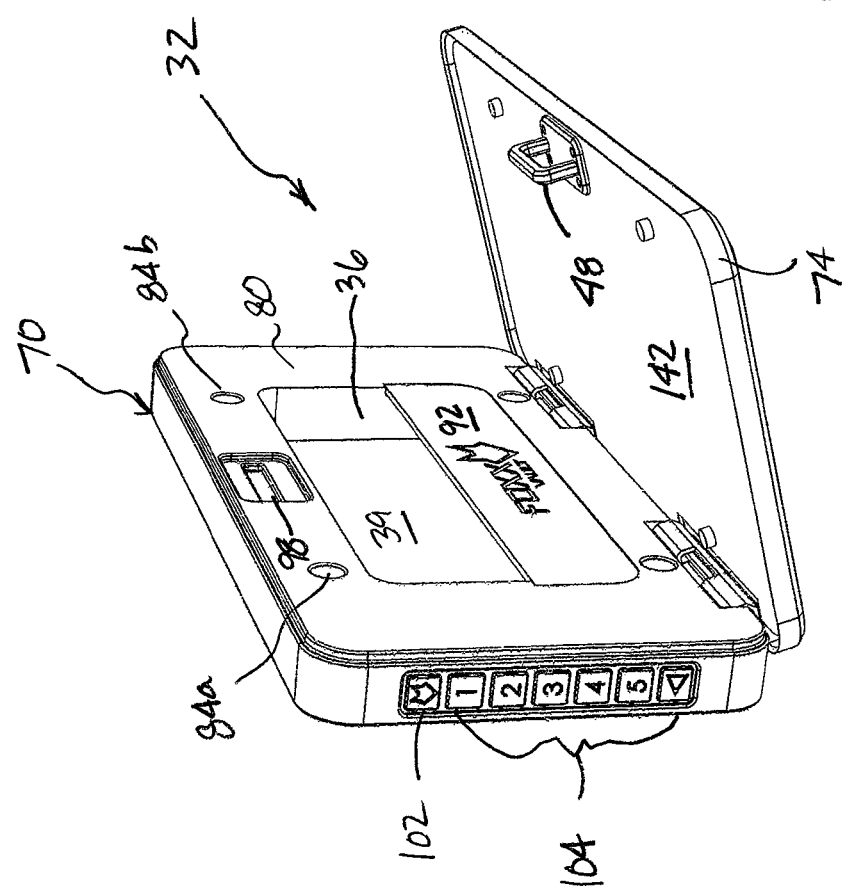

ANTI-THEFT LICENSE PLATE DISPLAY AND SECURE STORAGE SYSTEM

CROSS-REFERENCE TO OTHER APPLICATIONS

This application claims the benefit of U.S. Application No. 62/575,969, filed on Oct. 23, 2017, entitled the same, and which is hereby incorporated by reference in its entirety.

BACKGROUND OF THE INVENTION

1. Field of the Invention

The present invention relates broadly to license plate displays and secure containers, and more specifically, to a network enabled vehicle license plate holders with a secure storage compartment.

2. Background Art

Early attempts aimed at providing keys for entering and starting a vehicle, such as an automobile, were hardly secure and counted on the trustworthiness of the individuals in the nearby environment. For example, often the keys to the vehicle were simply left above the visor or in the glove compartment inside a vehicle that remained open. Anyone passing by could help themselves to the vehicle. While this may have been acceptable practice in a secured area, such as a police impound, and easily facilitates vehicle sharing, this approach is not a deterrent to vehicle theft for unauthorized users, especially in unsecured areas.

Another approach was to lock the vehicle and store the keys in a magnetic key box hidden inconspicuously in the wheel well or under the bumper. However, this approach is well known and there are limited locations to place the key box. Thus, the keys are easily located. Once located, the finder may open and use the keys in a conventional manner by opening the vehicle and starting the car. Thus, this approach does not secure the vehicle either. With the increase in ride sharing activities, such as those provided by car rental agencies or individuals offering such services, the ability to securely transfer the keys to a locked vehicle from a vehicle owner to a user or one user to another would be advantageous.

In addition to the foregoing key transfer issues, a common theft involves stealing a license plate or removing the DMV tags from the license plate. A traditional approach to installing a license plate involves the use of at least two screws or bolts to secure the license plate to the vehicle frame, either in the front or rear regions or both. Sometimes a vanity frame is added with the screws passing through the vanity frame which frames the license plate so as not to obscure the license plate numbers or tags. The vanity frame is also for personalization of the license plate area and often is imprinted with a sports team name, dealer name, or other personalized message. However, the conventional vanity frame offers no additional security to prevent removal of the license plate or access to the tags. Instead, it is a simple matter to remove the screws, then the vanity frame, and to steal the license plate. Even if the license plate is not removed, access to the DMV tags is quite easy as they remain exposed when attached to the license plate.

With the increase in vehicle sharing activities, there have been some attempts to secure a set of keys associated with a vehicle. One such attempt may be found in U.S. Pat. No. 7,966,071 to Downey. In this Downey patent, a mechanical lockbox was introduced with a weather-proof compartment and a license plate holder that mounts to the license plate bracket. There is also an outer frame comprised of a pair of hinged, rigid panels that is secured closed by the locking mechanism. The panels have a raised lip that forms a hollow in the panel. The rear panel includes holes for mounting to the license plate bracket. The license plate is placed inside the front panel adjacent to a cutout that exposes the license plate face. The weather-proof compartment is composed of a pair of mirror image, resilient, water-impermeable sheets, each of which fits within the hollow of one of the panels. Both sheets have a raised rim that forms a depression in the sheet. The sheet in the front panel holds the license plate against the cutout. When the frame is closed, the sheet rims abut, forming a weather-tight compartment and the fasteners holding the lock box to the vehicle are concealed. To open the compartment after it is locked by a key, the same key is inserted into the mechanical locking mechanism and turned until a cam turns out of a slot to clear the locking mechanism. The outer panel is hinged to the rear panel and may be opened once unlocked to expose the waterproof chamber inside and any contents stored therein. However, having to retain another key for managing a vehicle adds to the complexity of owning the vehicle and securing its access. Moreover, often keyless entry may be preferred in many circumstances.

An anti-theft license plate holder is provided in U.S. Pat. No. 7,257,912 to Yang. In this Yang patent, a module unit mounted to the exterior surface of a trunk door or rear door of a vehicle is provided for displaying a license plate. Without requiring a key or special tool, the module unit protects the license plate from being removed by an un-authorized person. The license plate can only be removed when a locking unit in the module unit is unlocked by activating a release unit from the interior side of vehicle. Such a module unit also protects the annual registration stickers from being removed by an un-authorized person. Thus, access to the license plate requires access to the interior of the vehicle. While this may deter some theft of the license plate, it would be useful to secure the interior of the vehicle while being able to store items externally. In addition, a portion of the module must penetrate into the interior of the vehicle requiring a modification to the vehicle with a through hole not typically required in securing the license plate to the vehicle.

Other approaches to license plate theft involve the use of special fasteners requiring a special tool to remove thus inhibiting anyone without the tool. However, such tools are easily misplaced or not available when needed. While this may add an additional step for the would-be thief, the purchase of such tools would enable the thief to remove the special fasteners to remove the license plate as well. Examples of such tamper proof fasteners may be found in U.S. Pat. No. 8,695,243 to Aldasem. The Aldasem patent also introduces some electronics in the form of an embedded SIM (subscriber identity module) chip within the holder with the vehicle having a corresponding chip installed therein. The vehicle SIM chip is encoded with the same data as the license plate holder SIM chip. If the secure license plate holder is removed from its assigned motor vehicle and installed on another vehicle, the difference between the data of the two chips will be readily detectable by appropriate equipment. In addition, removal of the plate and holder requires removal of part of the vehicle structure in order to avoid obvious damage to the fasteners and their covers.

While the foregoing approaches may deter theft of the license plate in some circumstances and the Downey patent provides an external lockbox, such solutions require the vehicle owner to be present for a key exchange and do not readily facilitate a secure key transfer among a plurality of users. In addition, these prior approaches fail to address vehicle and key tracking that support such vehicle sharing activities.

In addition to the foregoing approaches, solutions more focused on vehicle sharing activities may be found in U.S. Pat. No. 9,373,201 to Jeffries and International Publication No. WO 2016/201355 to Golduber. In the Jeffries patent, a rental/car-share vehicle access and management system and method is disclosed that, in some embodiments, utilizes barcodes, QR codes (or NFC/RFID), GPS, and a mobile app coupled with a wireless network to enable customers to bypass the reservation desk and pickup and drop off reserved vehicles using a mobile phone, tablet or laptop. The QR code, RFID, or NFC communication with the mobile application allows for identification of the vehicle by a mobile application, which, if authorized, can access the vehicle via a temporary access code issued by remote servers. The remote servers and/or mobile application communicates with a control module that plugs into the on-board diagnostics module of the rental/car-share vehicle and includes a host processing unit with a processor, an accelerometer, data storage, a GPS with internal GPS antenna, a wireless modem with internal antenna, and CAN bus transceivers connected with the processor, and a USB programmable interface. Such system is dependent on the on-board diagnostics module of the rental vehicle and does not enable the vehicle renter to communicate security data to a computerized security housing constructed to securely hold a key to unlock the vehicle.

In the Golduber publication, a system and method for vehicle sharing is disclosed in which a computerized client device in the form of a mountable vehicle license plate frame (SLPF) enabled for wireless communication and connection to a wide area network including a server. The SLPF device has a processor with an instance of the software executing from memory thereon, Global Positioning System (GPS) capability, power source, and a locking key compartment. The SLPF device may be easily mounted, after market, to the vehicles of registered vehicle owners. The server receiving a request from a registered vehicle renter to rent a vehicle, accesses the database and matches the request to at least one registered vehicle including the SLPF located within an area specified by the renter request and sends matching results to the vehicle renter's personal wireless communications device to select an available registered vehicle and sending location data (including GPS data) enabling the vehicle renter to locate the selected vehicle, and security data to enable the renter to unlock the key compartment and remove a key or other item to operate the vehicle. The server may track time of use, vehicle mileage and vehicle location while the vehicle renter is operating the vehicle. Upon completion of vehicle use, the renter replaces the key or other item in the locking compartment, sends notification of completion of use to the server which then completes a financial transaction between the renter and owner.

While suitable for some applications, the smart license plate frame described in the Golduber publication relies primarily on GPS and Wi-fi communications. Thus, among other issues, having a license plate vault as proposed in the Golduber invention requires significant power consumption by the smart license plate frame and network connections and additional product costs that may be prohibitive. Establishing a GPS connection also either requires GPS onboard or a minimum of a cellular connection much like a smartphone. Of related concern, the power supply in the smart license plate frame will drain quickly if it is transmitting Wi-Fi and GPS location on an ongoing basis with this approach. In such instances, it would be even more critical to ensure that there is an alternate method for accessing the vault that does not require a power source, a feature that Golduber does not appear to provide.

Moreover, when establishing a Wi-Fi connection using the Golduber system, an SSID must be broadcast and a secure password entered if used. However, the vehicle and associated license plate frame may be parked anywhere and merely having Wi-Fi access does not clearly locate the vehicle. While some NFC and Bluetooth communications are also referenced in Golduber which may enable a user app to communicate with a license plate frame when in the vicinity of the license plate frame, should the vehicle be moved, Golduber approach does not appear to address how the new location will be transmitted so the owner can locate the vehicle either.

Given the drawbacks of the prior approaches to preventing license plate theft and/or key transfer to facilitate vehicle sharing, there exists a need for an improved system that addresses the need to prevent theft of a license plate while also providing a secure but externally accessible storage vault, optionally independent of the vehicle electronics, that positively verifies the location of key or key fob within while providing a continuous or periodic update positively validating the presence of a key within the vault without requiring the owner to be in near field communication range of the vault as well as a related method of using such system.

SUMMARY OF THE INVENTION

In accordance with the principles of the present invention, one exemplary embodiment of an anti-theft license plate display and secure storage device is disclosed as a vehicle mounted lockable security vault constructed to secure at least one vehicle access component and generate a presence signal that may be relayed by a communication interface along with security vault location and locked status signals to a remote location, the communication interface further being responsive to an authenticated unlocking command from a remote location to unlock the security vault allowing a user to retrieve a vehicle access component when stored therein. A beacon in communication may also be provided to periodically or continuously announce at least one status indicator to one or more mobile communication devices within a predetermined range of the security vault.

In one aspect of the present invention constructed in accordance with the principles of the present invention, the security vault includes a housing with a cover plate hingedly coupled to the housing to create a storage compartment within the security vault when the cover plate is closed by a cover plate locking element responsive to release upon receipt of the authenticated unlocking command received by the communication interface.

In one embodiment constructed in accordance with the principles of the present invention, the security vault may include a vanity frame sandwiching a license plate to the security vault and a set of concealed fasteners securing the security vault to a portion of the vehicle frame to inhibit removal therefrom.

In another embodiment constructed in accordance with the principles of the present invention, a storage compartment within the security vault may incorporate a faraday cage shielding the vehicle access component from external wireless signals while still allowing the first sensor to detect and relay the presence status of the vehicle access component within the storage compartment.

In another embodiment constructed in accordance with the principles of the present invention, a removable electronics module may be concealed within the security vault while housing a variety of electronics for use in controlling access to a storage compartment within the security vault.

In yet another embodiment constructed in accordance with the principles of the present invention, a backup entry system accessible on the security vault is provided in case the primary entry system fails.

In yet another embodiment constructed in accordance with the principles of the present invention, a tampering sensor is incorporated into the security vault to detect unauthorized opening of the security vault or removal from the vehicle frame.

In yet another aspect of the present invention constructed in accordance with the principles of the present invention, the security vaults may be used as one component of a networked system with a server and a database and one or more mobile communication devices with user interface to oversee and manage a secure vehicle access component transfer system.

Methods of using the security vault in a networked environment to facilitate the secure transfer of vehicle keys without requiring the presence of the vehicle owner are also disclosed herein.

All of the embodiments summarized above are intended to be within the scope of the invention herein disclosed. However, despite the discussion of certain embodiments herein, only the appended claims (and not the present summary) are intended to define the invention. The summarized embodiments, and other embodiments and aspects of the present invention, will become readily apparent to those skilled in the art from the following detailed description of the preferred embodiments having reference to the attached figures, the invention not being limited to any particular embodiment(s) disclosed.

BRIEF DESCRIPTION OF THE DRAWINGS

FIG. 15 is a block diagram of database elements that may be used with the vehicle security vault system of FIG. 1.

FIG. 26 is an upper left perspective view of the security vault in FIG. 25.

DETAILED DESCRIPTION OF THE PREFERRED EMBODIMENTS

Figure 1:
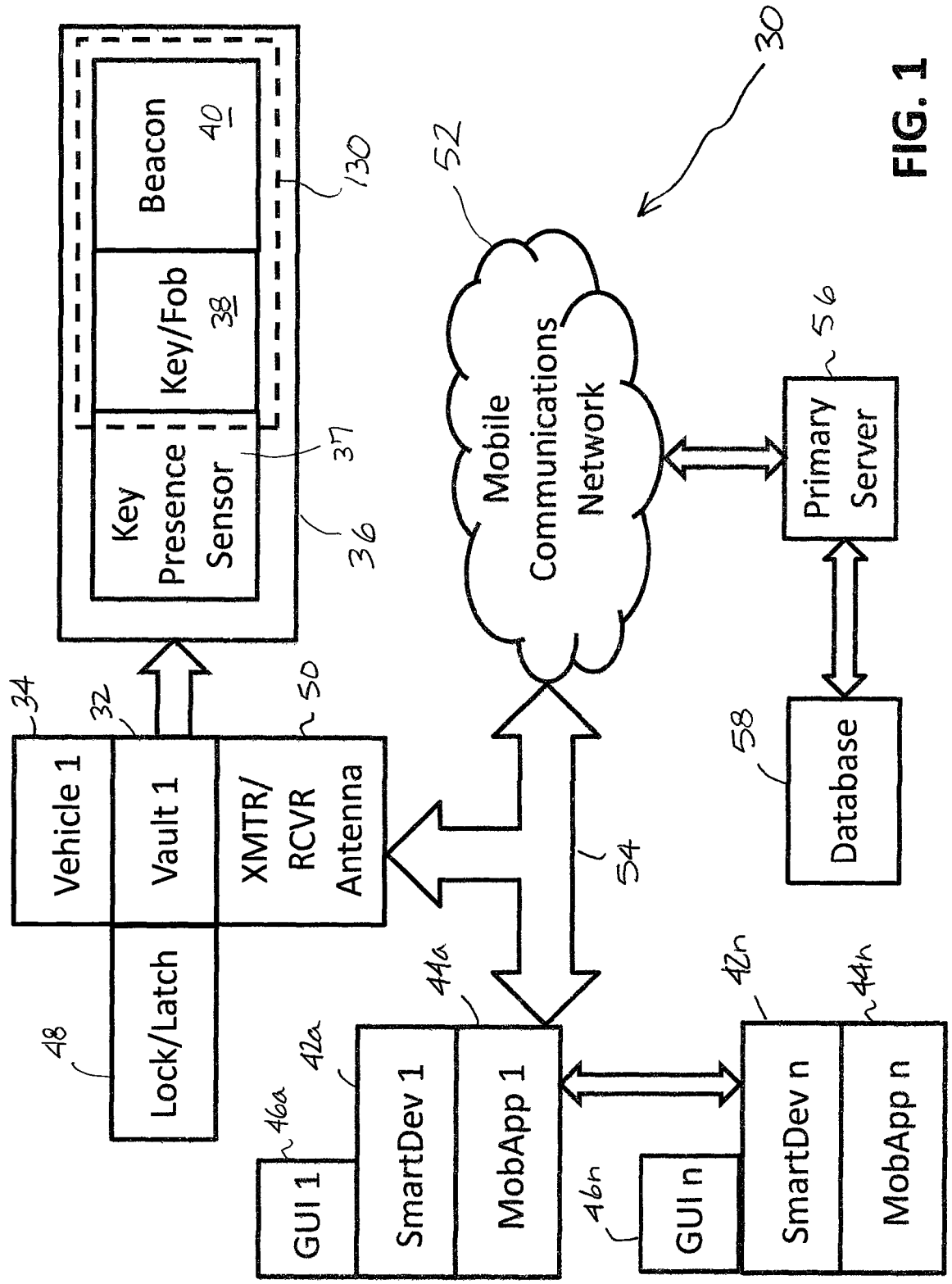
FIG. 1 is a schematic block diagram of an exemplary anti-theft license plate display and secure storage system constructed in accordance with the principles of the present invention.

Overview of the Vehicle Security Vault System:

Referring now to FIG. 1, an overview of an anti-theft license plate display and secure storage system (referred herein as the Smart Storage Vault or SSV), generally designated 30, for providing secure external storage on a vehicle while also inhibiting theft of the vehicle's license plate is illustrated. In this first exemplary embodiment, the SSV 30 generally includes a security vault, generally designated 32, capable of being secured to a vehicle frame 34 (FIGS. 1-2), such as to traditional licensing plate areas on the front and rear sections of the vehicle, with the security vault including a lockable storage compartment 36, with a key presence sensor 37, into which a set of keys or key fob 38 may be placed with the keys either coupled to or in communication with a beaconing device 40 that may be picked up by one or more mobile devices 42a . . . 42n, each mobile device including a mobile application 44a . . . 44n and a graphical user interface 46a . . . 46n for interfacing with a lock 48 securing the compartment 36.

With continued reference to FIG. 1, in at least one embodiment of the SSV 30 constructed in accordance with the principles of the present invention, the security vault 32 preferably includes a transmitter/receiver with antenna 50 for two-way communication with a mobile communications network, generally designated 52, such that the security vault 32 may communicate directly the one or more mobile devices 42a . . . 42n over a conventional mobile communication line that may include a mix of wired or wireless connections 54, as would be well known by one of ordinary skill in the art, and includes the internet, a Wide Area Network, a Local Area Network, a cellular communication network, a satellite communication network, a Wi-Fi network, a landline network, and other distributed communication networks, or a combination thereof. In addition, as explained below, the communications network and SSV may incorporate short range wireless communication capabilities including near field communications (NFC), Bluetooth, and Bluetooth Low Energy (BLE or Bluetooth Smart) in conjunction with devices used for location based technology such as that provided by beaconing (proximity) functionality, including, but not limited to, those available using Apple's iBeacon, Google's Eddystone, TRACKR and TILE or tag technologies to improve the location based precision compared to conventional GPS technology.

Further in communication with the mobile communications network 52 is a primary server 56, with all of the conventional components required to interface with the mobile communications network and processing data retrieved from a database 58 for storing and retrieving database information relating to a set of users, vehicles, and security vaults 32 such as vehicle make, model, license plate, driver information, driver's license, authorized users, vault access codes, unique vault ID, unique key ID, etc. as explained further below in conjunction with FIG. 15.

Figure 2:
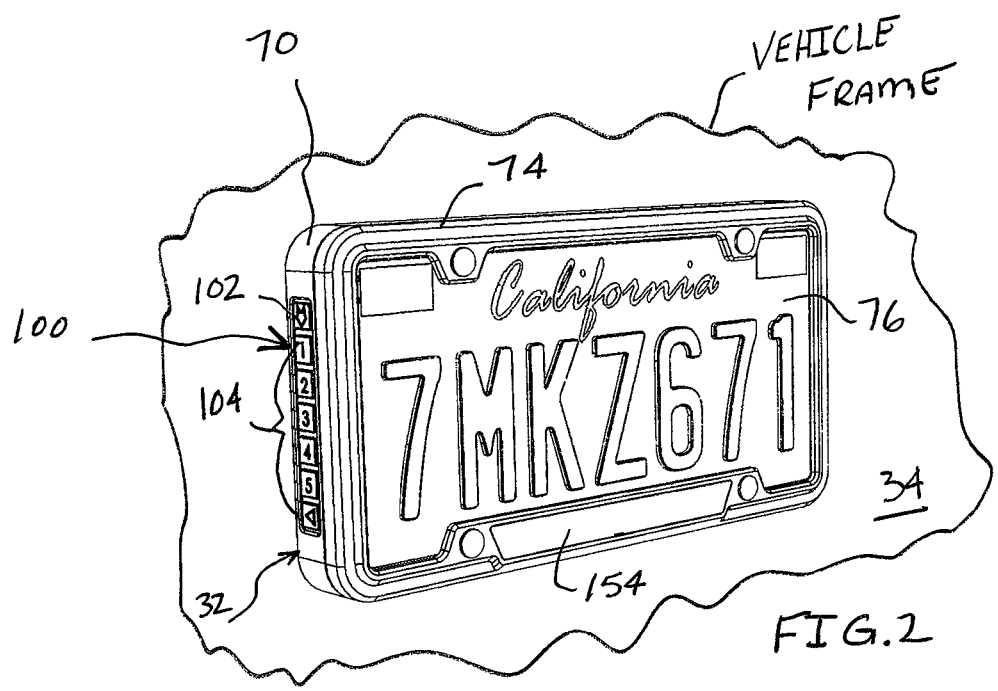
FIG. 2 is a left upper front perspective view of an exemplary security vault constructed in accordance with the principles of the present invention for use in the system of FIG. 1 and shown in the closed/secure configuration and secured to an exemplary vehicle.
Figure 3:
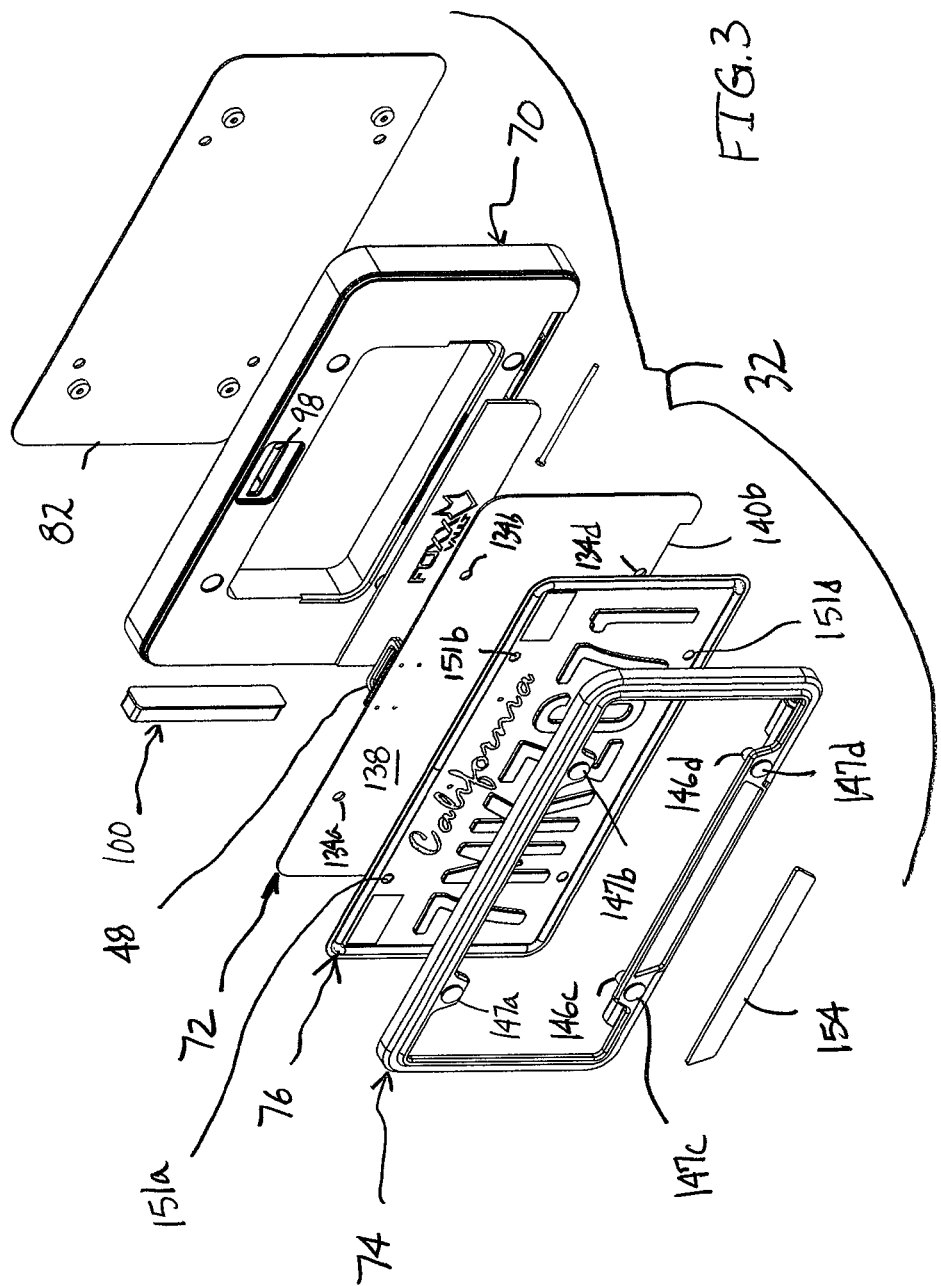
FIG. 3 is a right upper perspective exploded view of the security vault of FIG. 2 separate from the vehicle.
Figure 4:
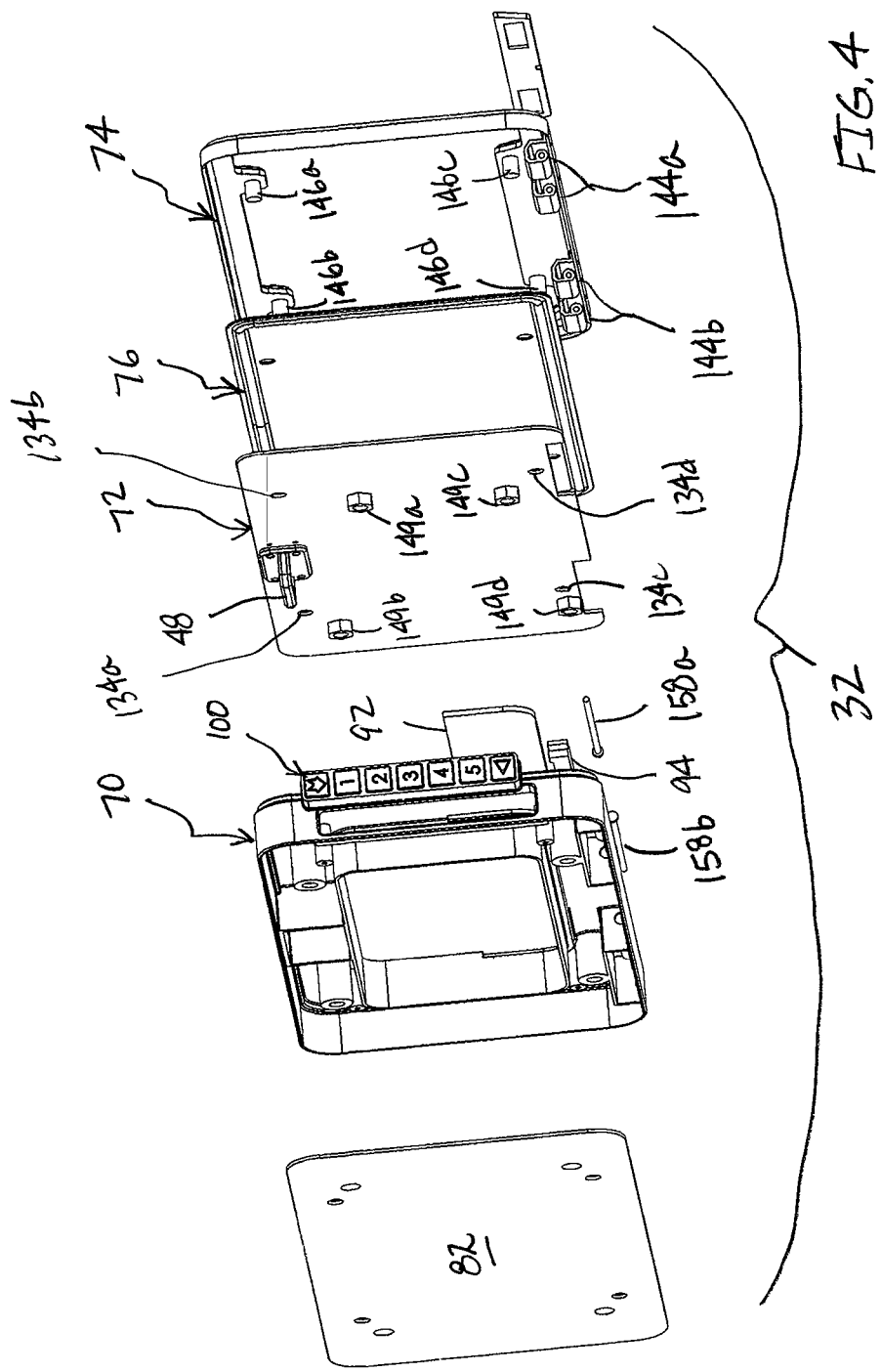
FIG. 4 is a left lower side perspective view of the security vault of FIG. 2 separate from the vehicle.

Referring now to FIGS. 1-14, an exemplary embodiment of the security vault 32 will now be described in more detail. As shown in FIGS. 2-4 for example, the security vault 32 generally includes several primary components including a main vault housing generally designated 70, a door plate generally designated 72, and a vanity frame generally designated 74 for securing a traditional vehicle license plate generally designated 76 each of which will be discussed in turn below.

Figure 5:
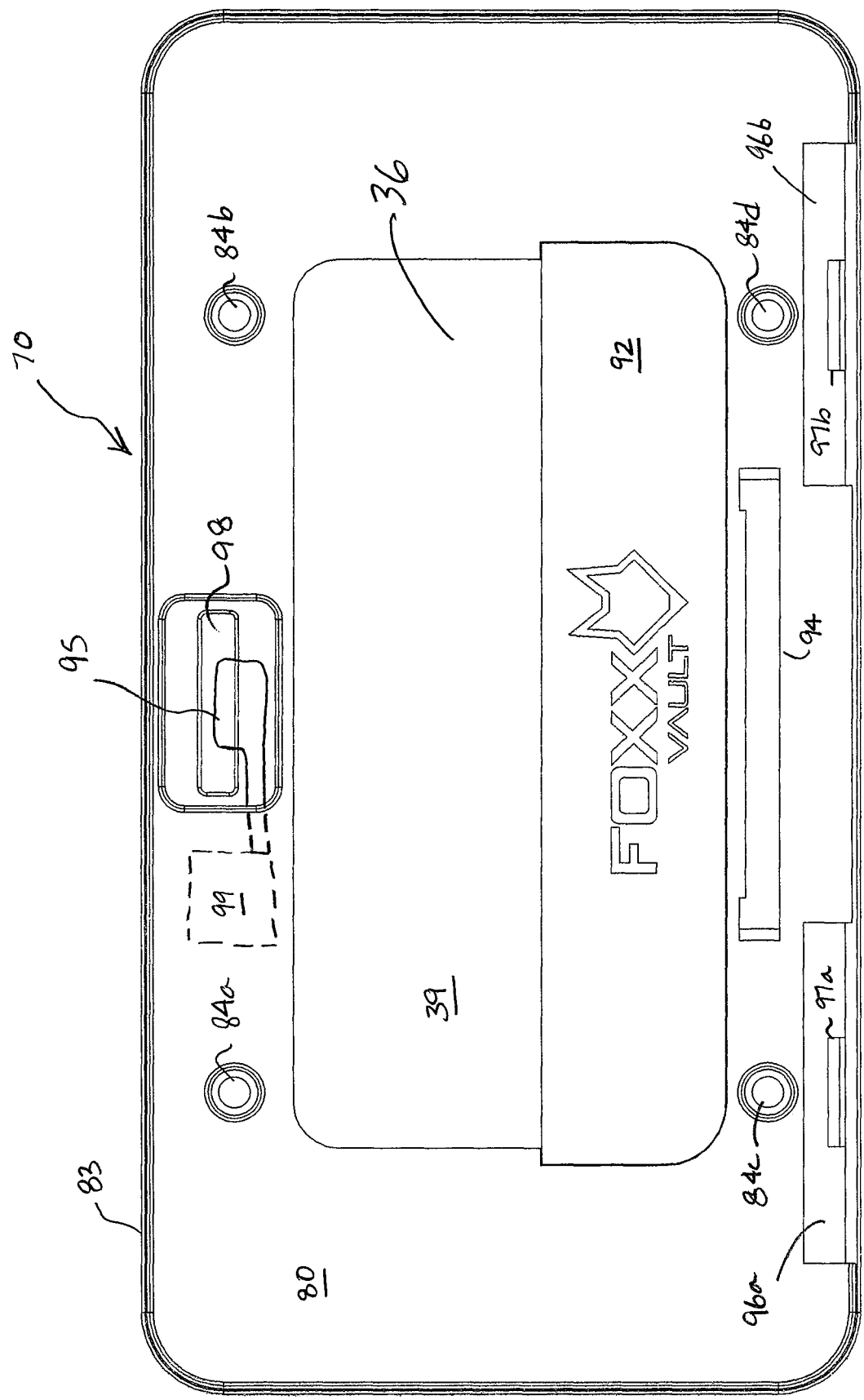
FIG. 5 is a front view of the main vault housing of the security vault of FIG. 2.
Figure 6:
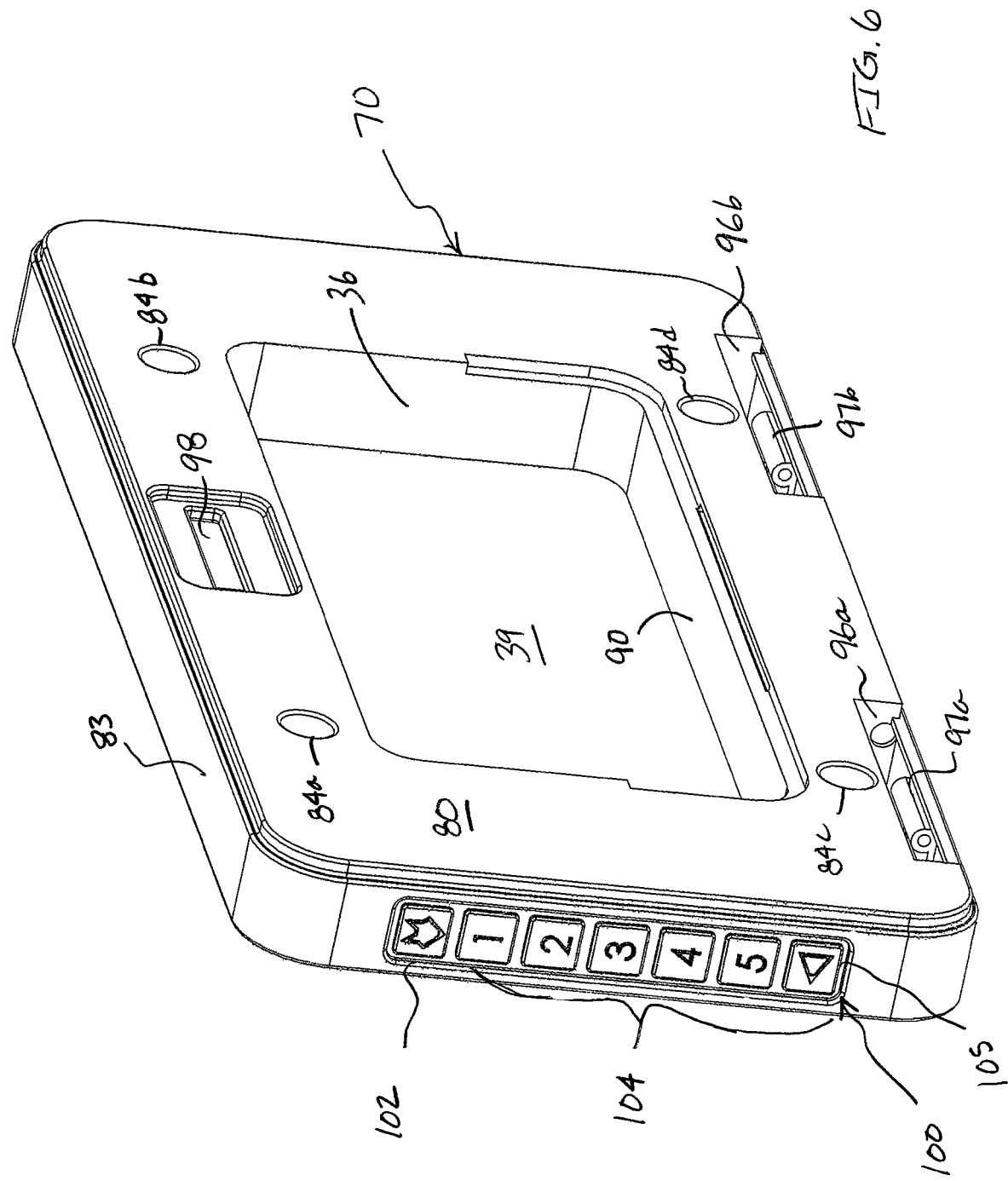
FIG. 6 is a left upper side perspective view of the main vault housing of FIG. 5.
Figure 7:
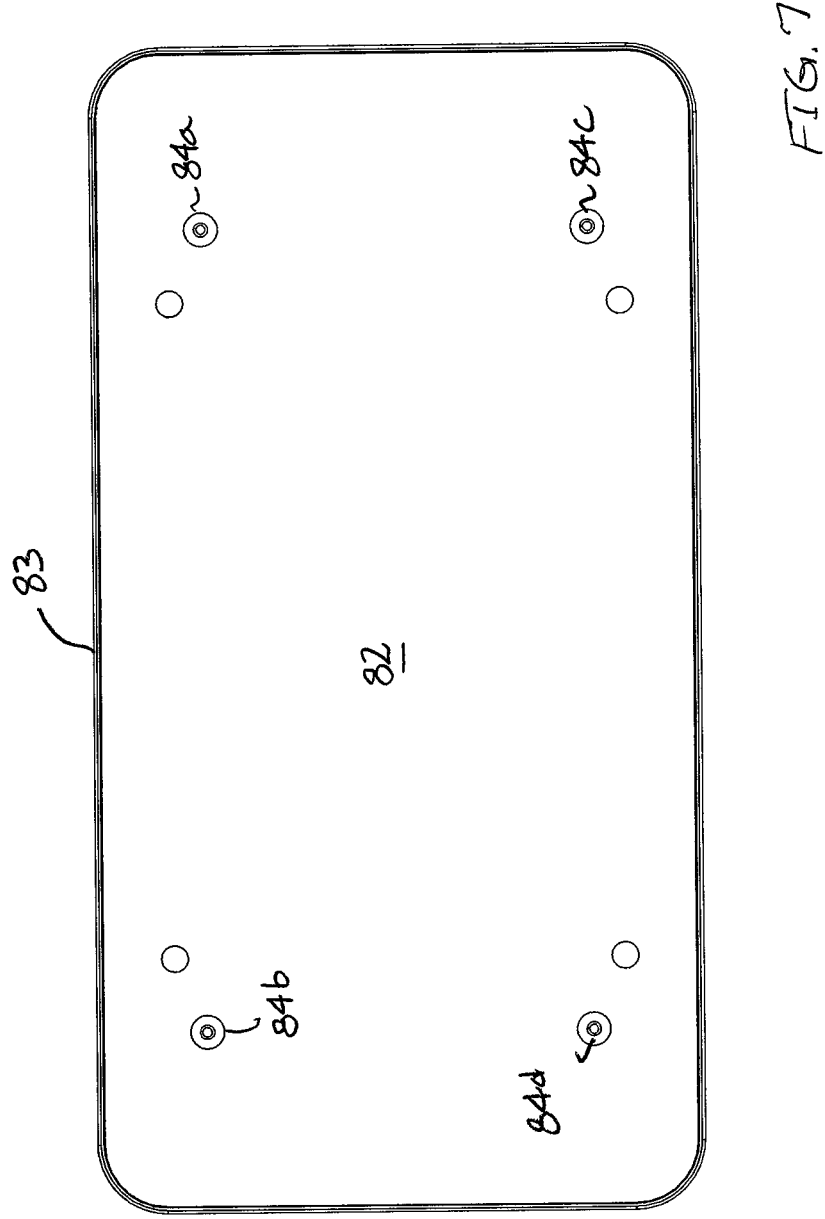
FIG. 7 is a rear view of the main vault housing of FIG. 5.

Turning now to FIGS. 4-6, the main vault housing 70 includes a front planar face 80 an opposing rear planar back plate 82 (FIG. 7). The front face 80 and back plate are spaced apart and joined to a housing perimeter wall 83 that defines a rectangular shaped housing with rounded corners as viewed in FIGS. 5-6. A set of four bolt holes 84a-d pass through the front planar face and extend through the rear planar back plate 82 for receiving a set of four main vault housing bolts. These vault housing bolts are not shown but understood to be the same or similar to fasteners used to secure a license plate to a vehicle frame or other special bolts that may enhance a secure connection for engaging a set of corresponding of traditional license plate bolt holes (not shown) in the vehicle frame 34 (FIG. 2). Such holes 84a-d may be the same size or be enlarged relative to the corresponding vehicle frame license plate holes or elongated in one or more radial directions to provide more security vault placement adjustability when mounting the security vault to the vehicle frame 34. However, whichever type of main vault housing fastener that is used to secure the main vault housing to the vehicle frame, it will be appreciated that the main vault housing bolts are used to secure the main vault housing to the vehicle frame and are inaccessible when the security vault is fully assembled and in a closed configuration adding to the overall security of the security vault 32. The main vault housing bolts may also be constructed to require a special tool to remove as an extra precaution. While a flat surface is compatible with most vehicles, the rear back plate 82 may also be constructed to follow the contour of a vehicle surface that is other than planar.

With continued reference to FIGS. 5-6, in addition to the bolt holes 84a-d above, the front planar face 80 of the main vault housing 70 also includes a central storage compartment 36 spanning a partial width of the main vault housing 70 as seen in FIGS. 5-6. The shape of the compartment 36 from the front view generally adopts the same contour as the outer perimeter 83 of the main vault housing 70. The compartment 36 includes a rear wall 39 recessed from the front face 80 of the main vault housing with the lowermost edge of the compartment forming a tray 90 (FIG. 6) on which a user may rest a set of keys, key fob, or vehicle access components 38 (FIGS. 1, 22) or other valuables to be secured. Spanning the lower portion of the storage compartment 36 is a transparent covering 92 (FIG. 5) providing a window into the storage compartment 36. In one alternative embodiment, this transparent covering may illuminate via an LED strip 94 when the compartment is opened to assist in viewing the contents stored therein.

Figure 14:
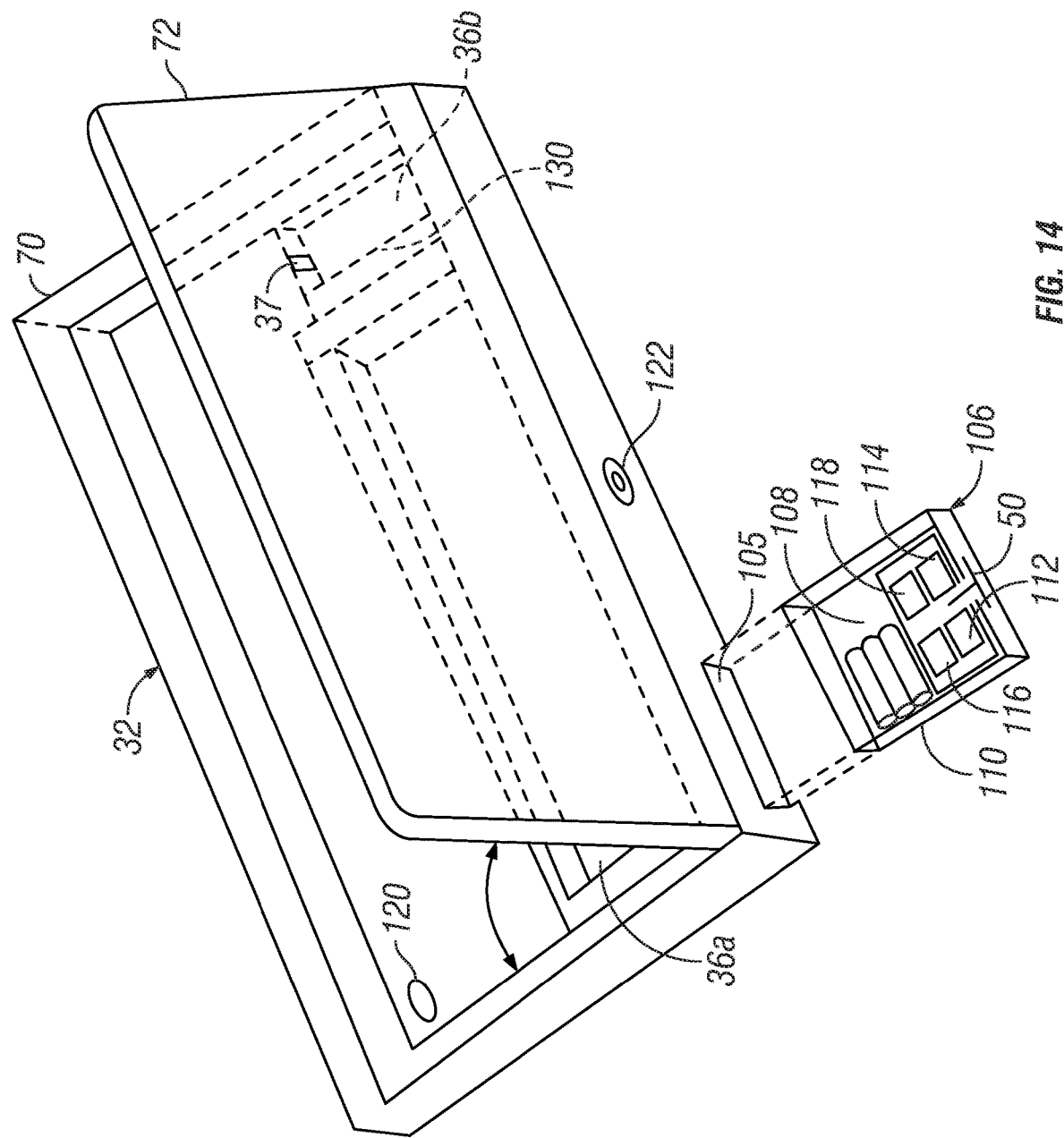
FIG. 14 is a left lower perspective view of an alternative main vault housing with a replacement component module.
Figure 16:
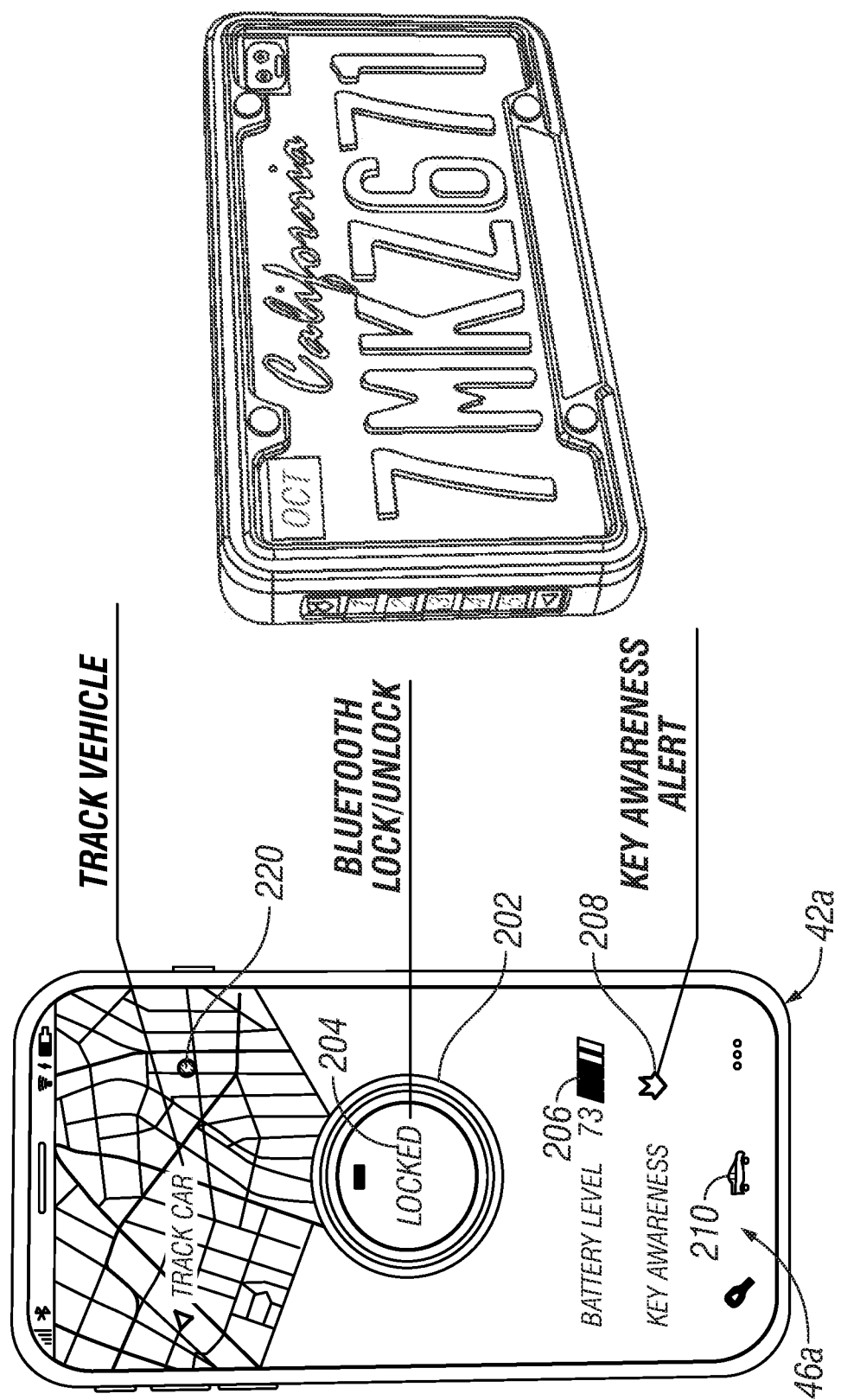
FIG. 16 is an exemplary screen shot of a mobile application graphical user interface for use with the vehicle security vault system of FIG. 1.

With continued reference to FIGS. 5-6, along the bottom edge of the main vault housing 70, a set of spaced apart hinge receptacles 96a, 96b, each having one hinge portion 97a, 97b of a hinge set which are provided for engaging a complementary hinge portion of a hinge set pivoting door plate 72 and vanity frame 74 assembly which will be described below in more detail. In this exemplary embodiment, the hinge portions 97a, 97b provide the central knuckle or barrel portion of the hinge and are fixed to the main vault housing 70. At the upper end of the main vault housing is a latch receptacle 98 for receiving a latch secured to the pivoting door plate 72 described below. A latching mechanism 95 generally provided in the form of an interference tab, boss, hook, tooth, claw or other structure for capturing and engaging the latch 48 (FIGS. 1 and 9) and is disposed within the latch receptacle to capture the latch 48 and hold the door plate 72 in a closed configuration. The latching mechanism is preferably actuated by a motor 99 in communication with and responsive to an authorized signal from the one or more components in the mobile wireless network 52 via the antenna 50 such as the actuator 116 (FIG. 14). Alternatively, the latching mechanism may incorporate a magnetic coupling device that is demagnetized to open and magnetized to retain the cover plate 72. Such latching mechanisms are well within the purview of one of ordinary skill in the art.

As view in FIGS. 2, 4 and 6, the left side of the main vault housing 70 includes a primary interface panel, generally designated 100. The primary interface panel includes a wireless communication section 102 and an auxiliary unlocking section 104 as a backup in case the wireless signal to the security vault 32 is interrupted, jammed, or otherwise fails to engage for some reason, including loss of battery power. The wireless communication section includes the circuitry for transmitting information including the status of the door (locked/unlocked), key presence (present, not present), and unique ID of the security vault as well as receiving the access codes from one or more components in the mobile communications network 52, with all such information being stored in and retrievable from the database 58. The backup lock section 104 is provided in the form of a set numeric push buttons for manually entering the access code to unlock (and lock) the security vault. A set of tumblers, dials, or other manual key entry devices or systems may be as well. A combination success indicator 105 is provided and lights up green when the correct combination is entered and red when the incorrect combination is entered.

Referring now to FIG. 14, the main vault housing 70 may incorporate a slot 105 constructed to receive a removable sealed electronics module, generally designated 106, that may be a standalone module or plug into a wiring receptacle [not shown] within the vault housing 70. Such module may be placed directly in communication with the motor 99 (FIG. 5) using a conventional wiring harness or circuit board or wirelessly communicate with motor to control the latching mechanism 95. The module 106 includes the electronic components required for several security vault 32 features. In this exemplary embodiment, the electronics module 106 includes a battery compartment 108 with a set of one or more batteries 110 of sufficient power to support the security vault 32 features. The module 106 further includes a Bluetooth LE chip 112, a microcontroller 114, an actuator 116, a wireless communication antenna 50, and at least one sensor 118, such as an accelerometer for determining impact movement due to tampering or a vehicle accident. It will be appreciated that the removable module is only accessible when the door plate is opened or removed so as to prevent tampering with the security vault 32. For example, the door plate 72 or outer vanity frame 74 may cover the module 106 within the slot 105 or the module may be releasably secured to the main vault housing 70. One suitable, non-limiting Bluetooth LE chip has been found to be an Espressif ESP-WROOM-32. Other suitable IoT solution chips will occur to one of ordinary skill in the art.

As further shown in FIG. 14, the main vault housing 70 may include an optional connector 120 to the vehicle's electrical system such as via a wiring harness or plug in. If the vehicle provides a wireless communication mode, then this connector may allow for such communication. In addition, an aperture 122 for placement of a backup camera may also be provided.

Figure 13:
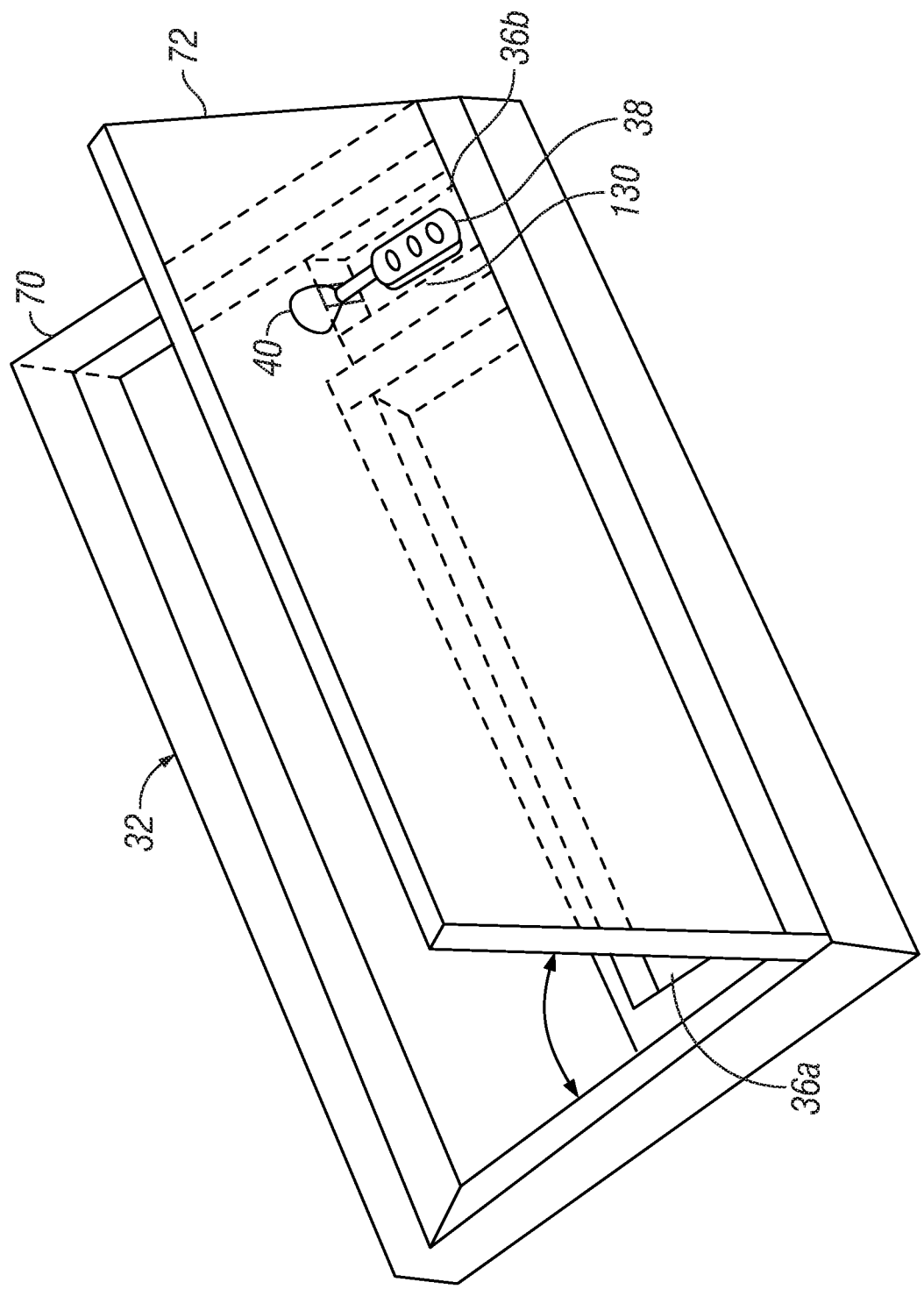
FIG. 13 is a left lower perspective diagram of an alternative main vault housing and cover plate illustrating a multi-compartment structure with an exemplary key fob contained therein.

As shown in FIGS. 5, 6, and 13-14, the compartment 36 may be one continuous compartment or segmented into different sections. In FIGS. 5-6, for example, the compartment 36 is one continuous compartment or pocket. In FIGS. 13-14, however, one portion 36a of the compartment may be dedicated to receipt of a wallet or phone while a complementary smaller portion 36b may be used for receipt of a set of keys or key fob 38. In one embodiment, the portion constructed to receive the key fob may be shielded from electromagnetic waves using a structure such as a Faraday cage 130 (FIGS. 13-14) as would be understood by one of ordinary skill in the art. Alternatively, the key fob 38 may be placed into a portable Faraday cage (not shown) such as a pouch, bag, or sleeve that may be placed into the compartment with the key fob inside. In this exemplary embodiment, the key fob or set of keys includes a beacon component 40 (FIGS. 1, 13) for transmitting or announcing a beacon signal using beacon technology to the one or more smart devices 42a-42n that have a mobile application 44a-n programmed to detect one or more beacons 40. In addition, the compartment 36, 36b may include an electromagnetic sensor 37 (FIGS. 1, 14) to detect the presence of a key or key fob 38 within the compartment 36. The key presence sensor is placed in communication with the module 106. Even if a Faraday cage 130 is used, the EM sensor 37 is constructed to pass a key presence signal to the module 106 through the confines of the Faraday cage. However, the fob 38 itself remains isolated from wireless communications while in the cage 130 to prevent the key fob opening the vehicle because of proximity as is customary in some vehicle models. It also prevents unauthorized users from hacking the key fob and opening the vehicle remotely. Other suitable key presence sensors will occur to one or ordinary skill in the art.

Referring now to FIGS. 3-4 and 8-9, the compartment 36 is preferably covered by a door plate 72 that conceals both the main housing bolts (not shown) and the compartment 36 when in the closed position. In this exemplary embodiment, the cover plate or door plate 72 is a solid planar plate and, like the main vault housing 70 described above, the door plate is constructed of a material to resist a destructive force such as a drill or cutting tool to protect the contents of the compartment 36 (or 36a, 36b). The door plate 72 includes four bolt bores 134a-d (FIG. 8) for receipt a set of decorative vanity frame bolts 147a-d (FIG. 10) or other suitable fasteners for securing the vanity frame 74 to the door plate 72 as will be described in more detail below. The front face 138 of the door plate 72 is planar with the bottom edge being notched at two spaced apart hinge apertures 140a, 140b constructed to allow a set of corresponding hinges 144a-b (FIGS. 9, 11) on the vanity frame to pass through and engage the complementary hinge portions 97a-b fixed to the main vault housing 70.

Figure 8:
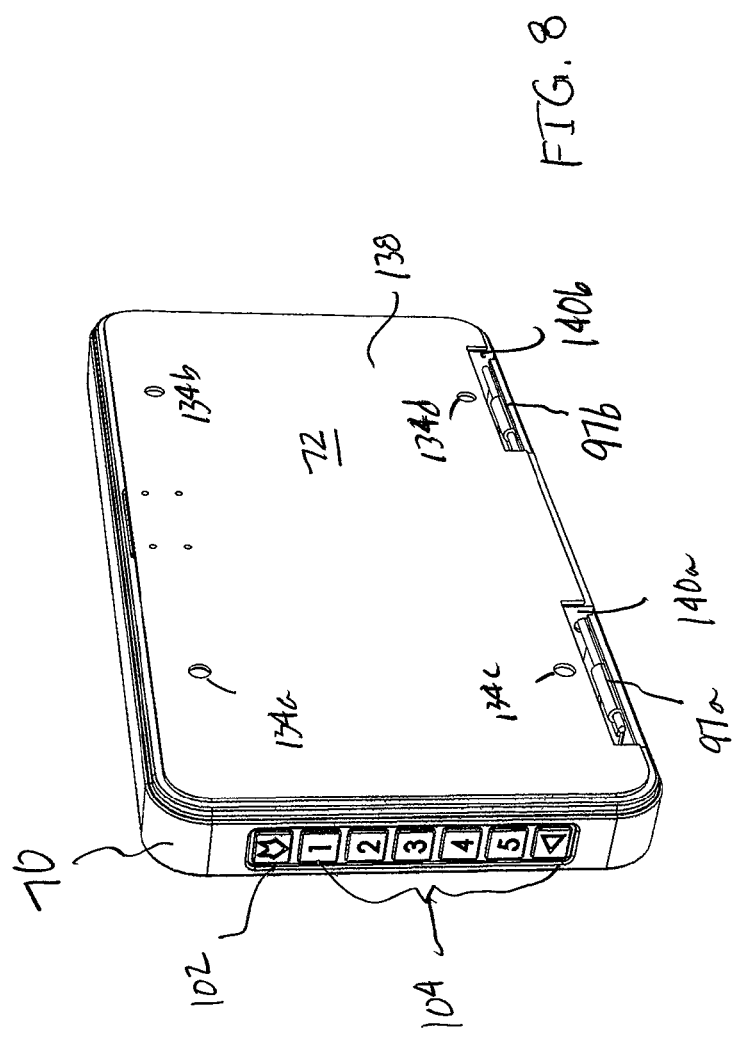
FIG. 8 is a left upper perspective view of the main vault housing and door cover plate in a closed configuration.
Figure 9:
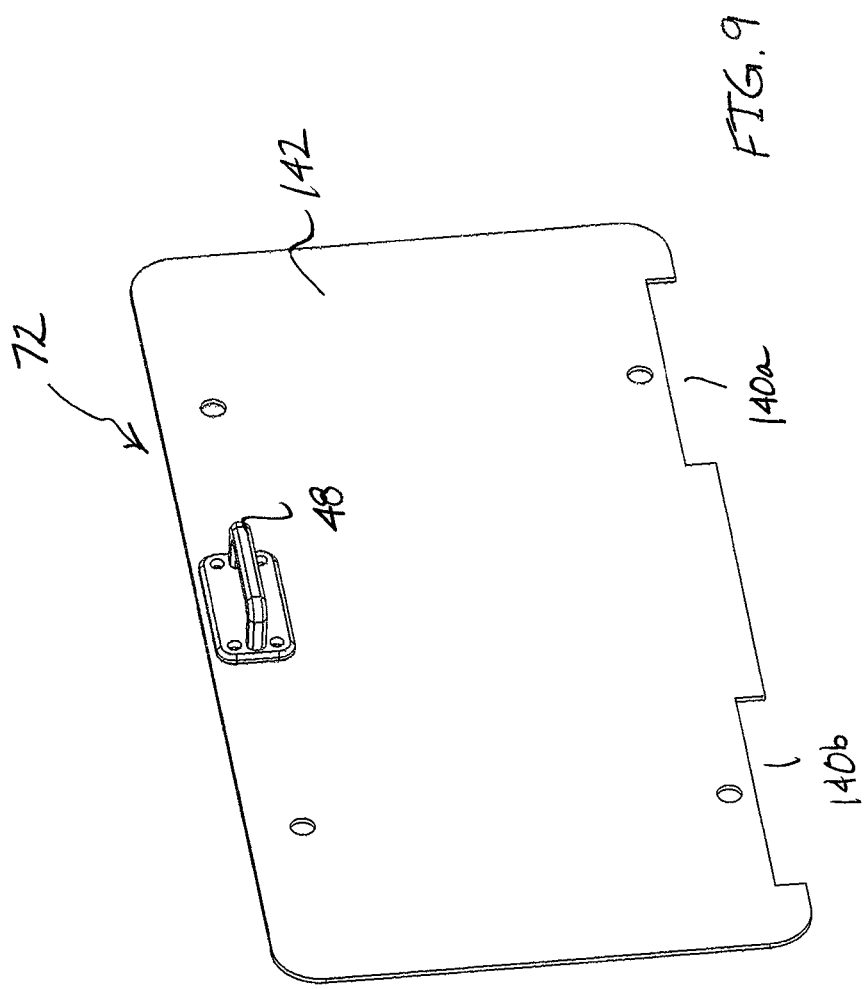
FIG. 9 is a rear of the cover plate of FIG. 8.

With reference now to FIGS. 4, 8 and 9, the rear surface 142 of the door plate 72 includes a U-shaped latch 48 extending rearwardly for insertion into the door latch receptacle 98 (FIGS. 5, 6) of the main vault housing 70 (FIG. 5). With the door plate 72 and vanity frame 74 coupled together, the door plate/vanity frame unit is pivotally coupled to the main vault housing 70 by the hinge sets 97a, 144a and pivot pin 158a and 97b, 144b and pivot pin 97b.

Turning now to FIGS. 3-4 and 10-12, the vanity frame 74 is used to secure a conventional license plate 76 by incorporating a set of four fastener bore sleeves 146a-d (FIG. 4) positioned to coincide with and slip fit into the four bores 151a-d in the traditional license plate 76. The bore sleeves 146a-d extend rearwardly and pass through the corresponding bores 134a-d (FIGS. 3, 4 and 8) in the door plate 72. The frame is constructed so as not to obscure the license plate when mounted behind the vanity frame but to inhibit the license plate from being removed when the vanity plate is secured to the main vault housing 70 by covering a perimeter of the license plate. A set of vanity frame bolts 147a-d (FIG. 10) may be inserted through the corresponding bore sleeves 146a-d and secured behind the door plate 72 using a set of complementary nuts 149a-d (149a, 149c, 149d shown in FIG. 4). This secures the vanity frame 74, license plate 76, and door plate 72 into an integral unit with a bottom end that may then be pivotally secured to the main vault housing 70 using the hinge sets 97a, 144a, and pivot pin 158a and 97b, 144b and pivot pin 158b. The top end of the door plate/license plate/vanity frame unit may be secured at the top end by the latch 48 extending rearwardly from the door plate coupled with the latching mechanism 95 with the latch receptacle 98 of the main vault housing 70.

Figure 10:
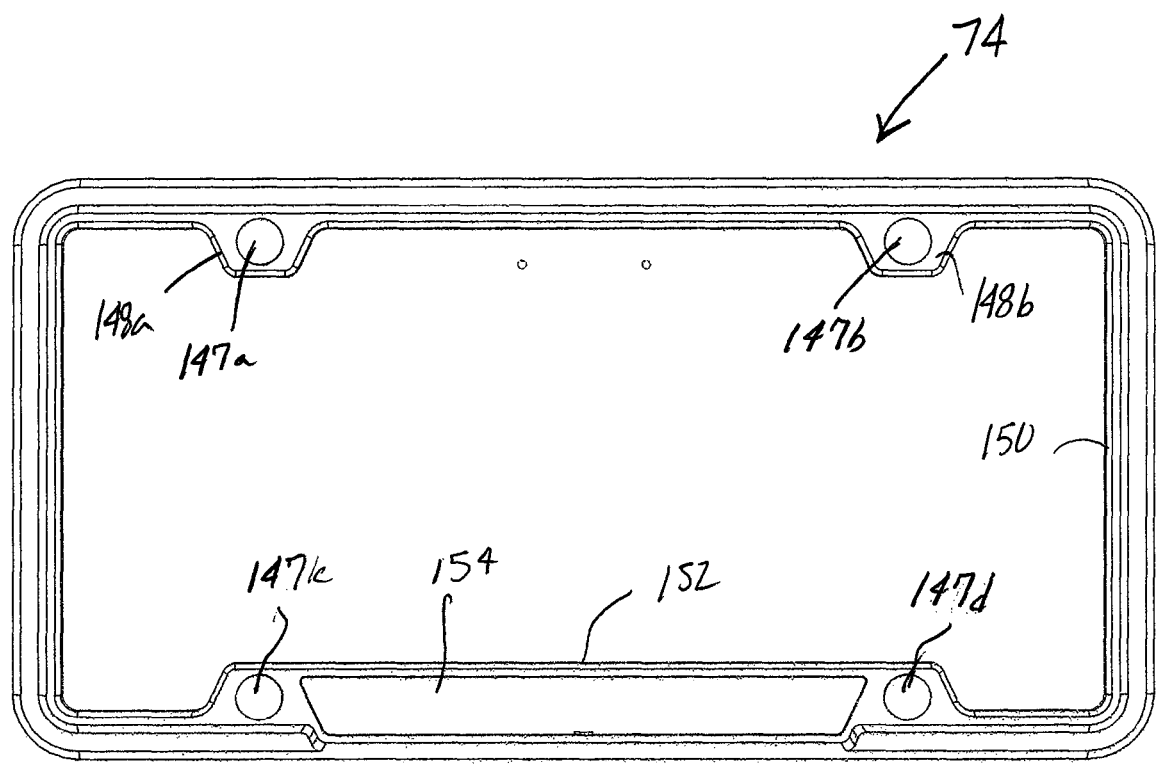
FIG. 10 is a front view of the front vanity frame and cover plate of the security vault of FIG. 2 with the license plate removed.

With continued reference to FIG. 10, the top two fasteners 147a, 147b appear in a pair of spaced apart tabs 148a, 148b extending inwardly from the perimeter 150 of the frame. The bottom two fasteners 147c, 147d appear with an elongated central tab 152 also extending inwardly from the perimeter 150 of the frame 74. A removable insert 154 may be plugged into a complementary receptacle (not shown). The removable insert may be used to customize the vanity frame without removing the vanity frame from the main vault housing 70 by simply withdrawing the insert from its receptacle and then plugging an alternative design into the receptacle. Alternatively, this insert may be magnetically secured to the vanity frame.

Figure 11:
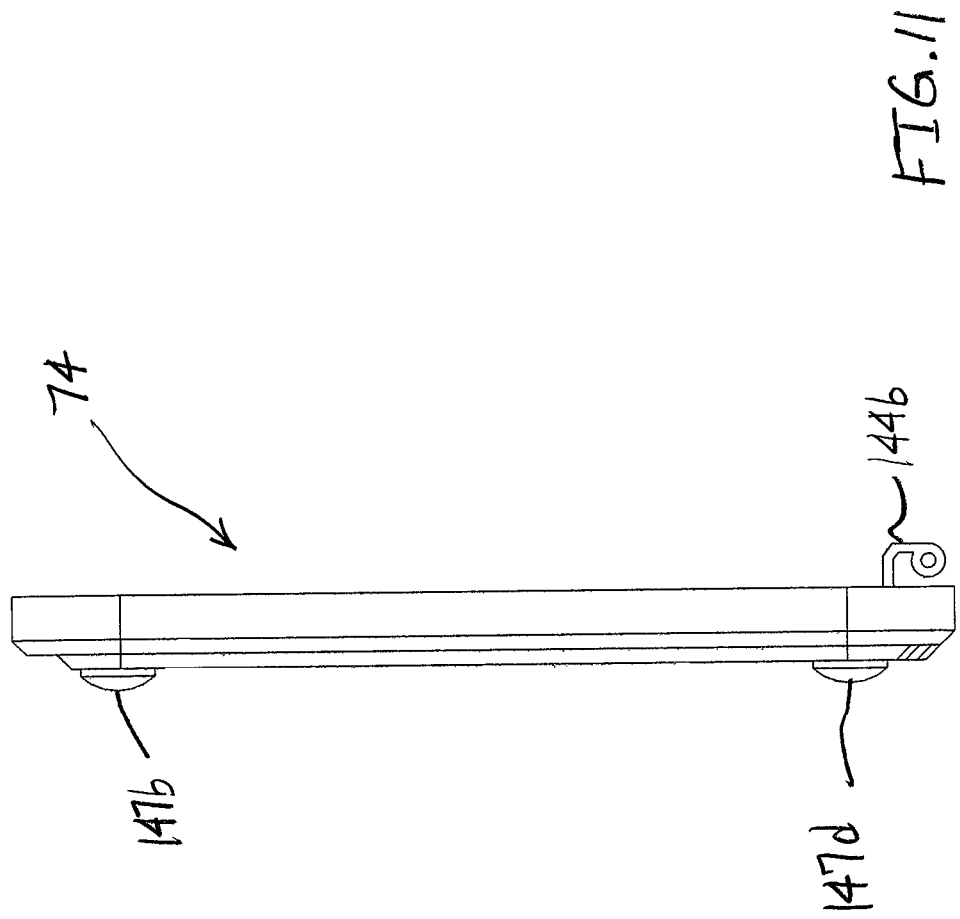
FIG. 11 is a right side view of the front vanity frame of FIG. 9.
Figure 12:
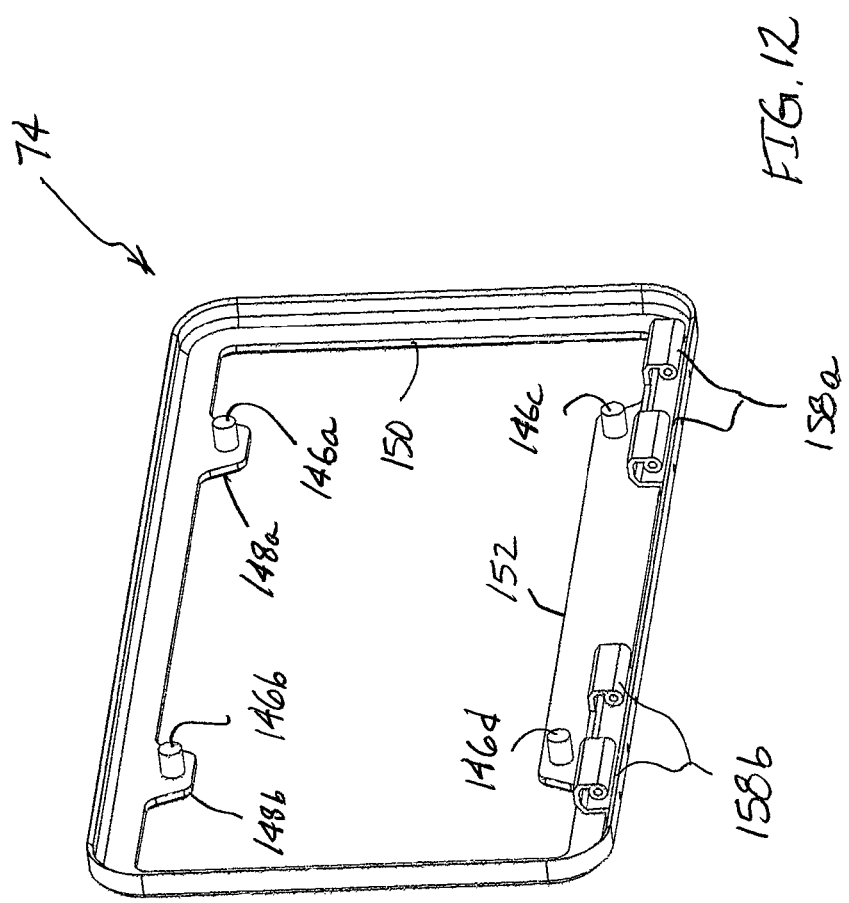
FIG. 12 is a rear perspective view of the front vanity frame of the security vault of FIG. 2.

As shown in FIGS. 11-12, the rear side 156 of the vanity frame 74 includes a set of opposing hinge portions 144a, 144b, providing the outer knuckle or barrel portions that engage the corresponding central knuckle or barrel portion 97a, 97b. One hinge set is composed of hinge portions 97a, 144a, and a pivot pin 158a while the other hinge set is composed of hinge portions 97b, 144b, and a pivot pin 158b for pivotally securing the door plate 72, vanity frame 74, and license plate 76 sandwiched therebetween to the main vault housing 70.

As shown in FIGS. 2-3, the license plate 76 is a conventional license plate that be used with the various embodiments described herein. Notably, the license plate 76 includes a set of four bores 151a-d aligned with the corresponding bores in the vehicle frame 34. While the embodiments described herein are used with a traditional automobile license, other vehicular license plates wherein a secure vault housing may secured to a vehicle frame may be used. In addition, secure vault may be used as an alternative to a lockbox on a property such as when providing access during a real estate showing or to allow staff or visitors to enter a premises by securing the vault to the housing structure.

Figure 20:
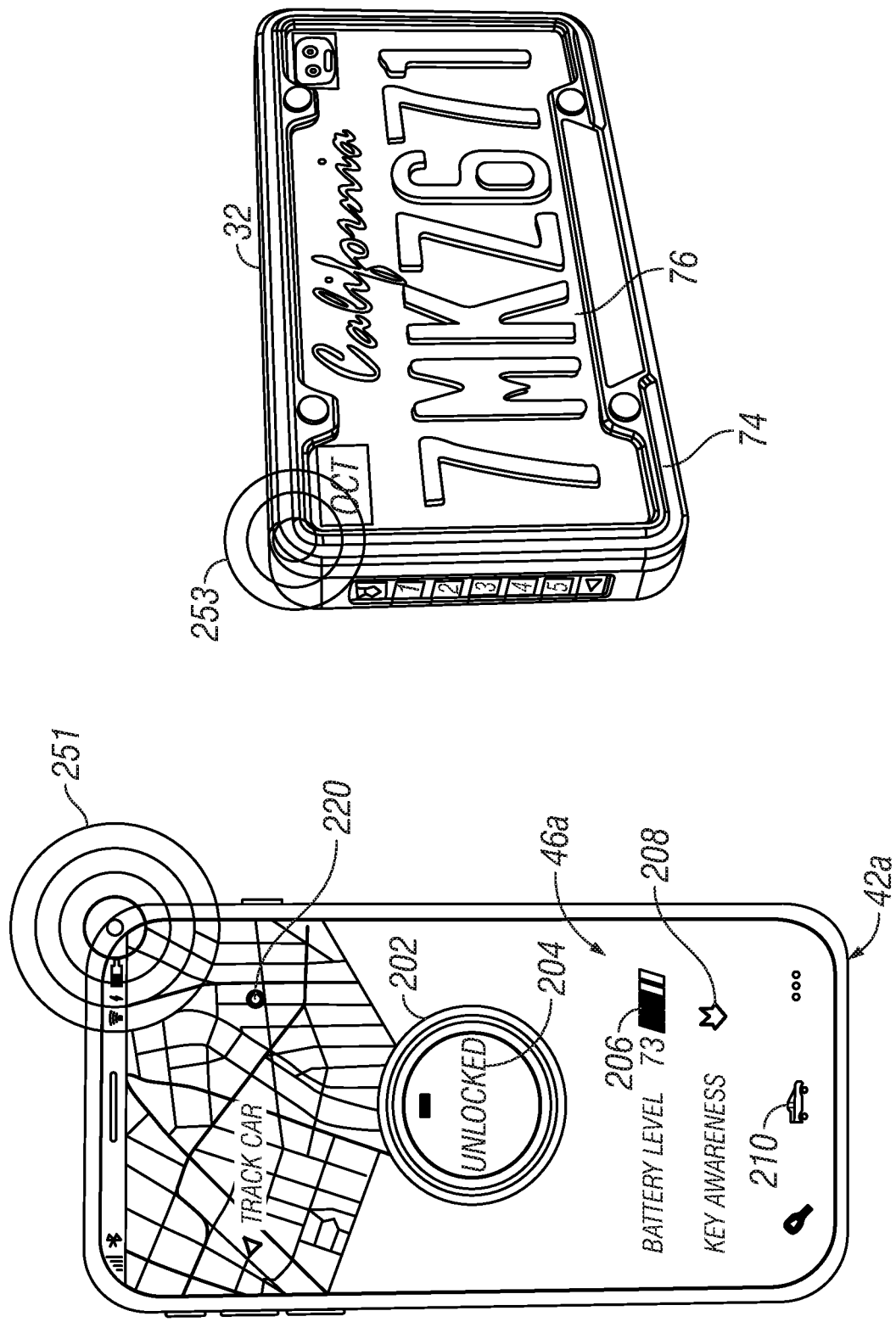
FIG. 20 is a schematic diagram of an exemplary mobile device transmitting an unlocking code to the security vault in accordance with the principles of the present invention.
Figure 25:
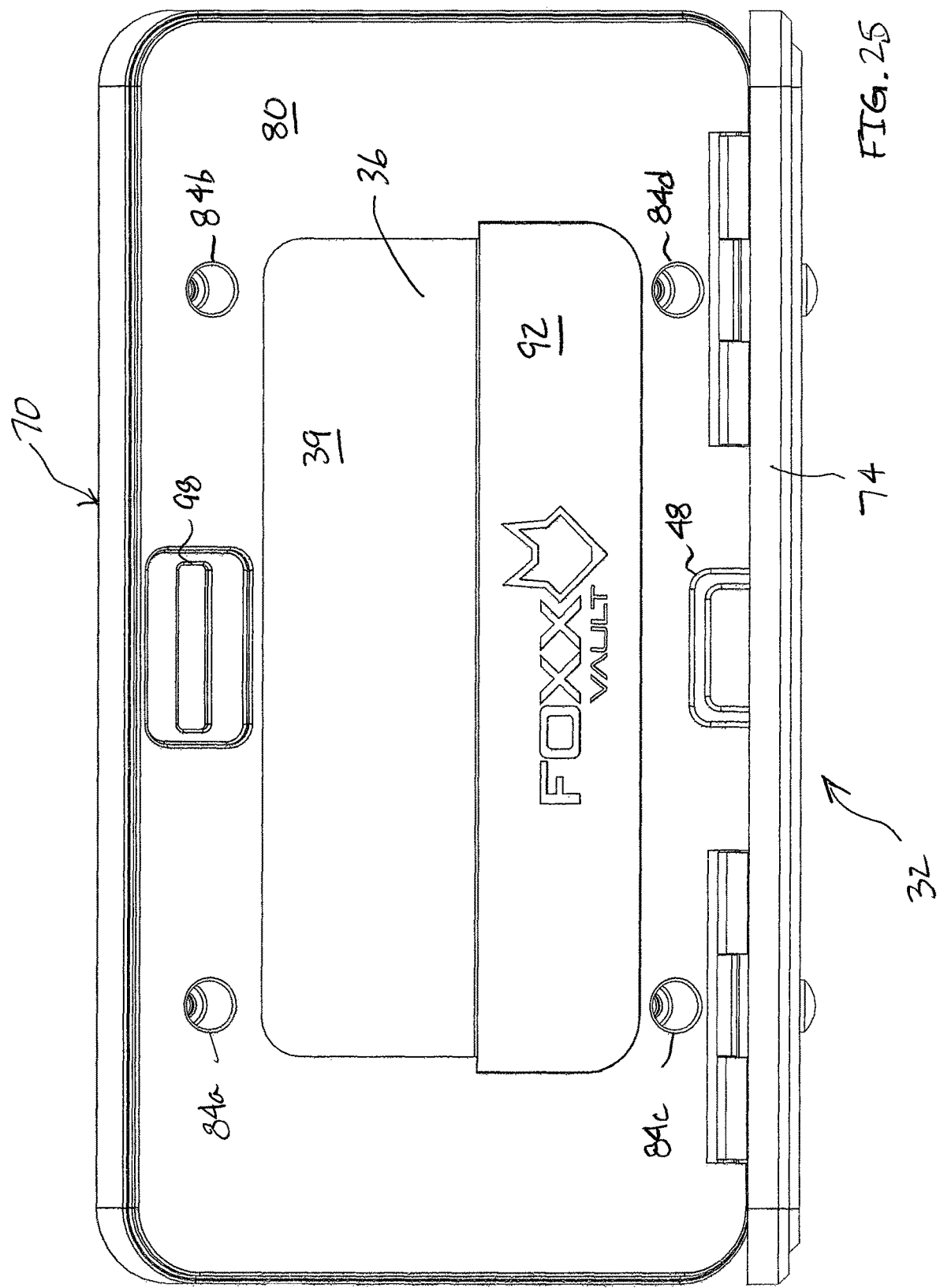
FIG. 25 is a front upper view of the exemplary security vault of FIG. 2 in an open configuration.

When assembled together, in a closed configuration, and secured to a vehicle frame 34, the security vault 32 is as shown in FIGS. 2 and 20 and presents a relatively low profile vault for securing a vehicle user or owner's valuables. Open configurations are shown in FIGS. 25-26.

Figure 22:
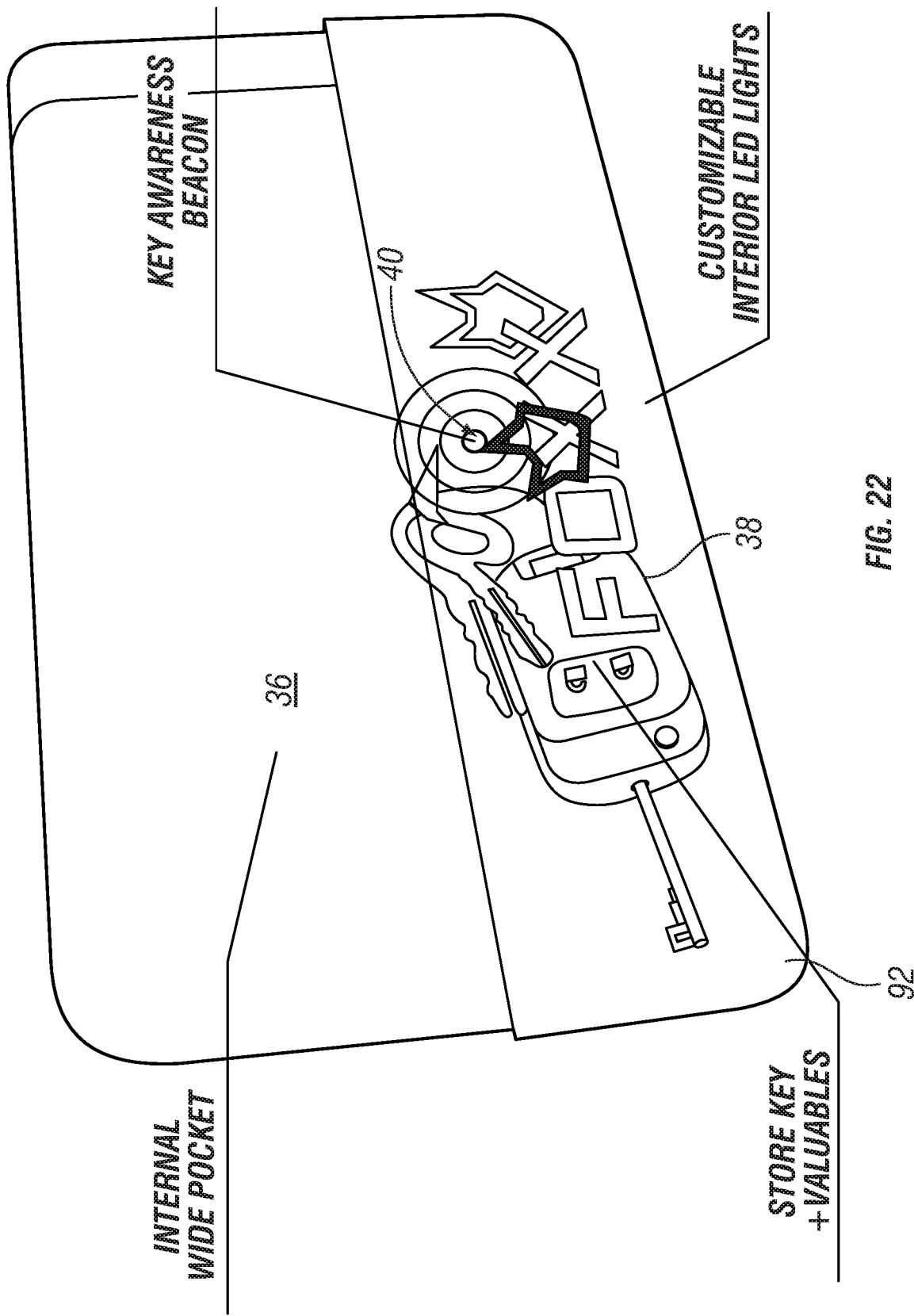
FIG. 22 is a close up schematic view of the storage compartment within the security vault of FIG. 2 with an exemplary key fob stored therein.

Database Elements:

Turning now to FIG. 15, the database 58 may contains records, elements, components, and/or data for facilitating the location of a vehicle 34 (FIG. 1) and secure transfer of a set of keys or key fob 38 (FIGS. 1, 22). A non-limiting list of exemplary database elements as shown in FIG. 15 includes: Unique Vault ID 160, Unique Access Code 162, Unique Key FOB ID 164, Unique USER ID 166, User Login ID (e.g., username/email, password) 168, User Permissions 170, User Information 172, Vehicle VIN 174, License Plate No. 176, Vehicle Location (Coordinates) 178, Key Location (Coordinates) 180, Tamper Status (Alert, No Alert) 182, Key Presence in Vault (Present, Not Present) 184, Lock Status (Open, Locked) 186, Vehicle Owner Info 136, Vehicle Mileage 190, Bluetooth LE Status 192, Beacon Status 194, and Battery Status 196, all of which may be accessible where needed by the primary server 56 and mobile apps 44a . . . n on the user smart devices 42a . . . n in order to locate a vehicle and conduct a secure key transfer in accordance with the principle of the present invention. User access to this database information will require appropriate certificate management, device and user registration, authentication mechanisms to verify user identity, encrypted data in transit and in the database and certificate pinning. In one embodiment constructed in accordance with the principles of the present invention, the data may be stored in a Graph Database or in another more traditional SQL relational database methodology. Interaction of the embedded software on the device is through JavaScript Object Notation (JSON) structures in either implementation. Such information may be displayed on the GUIs 46a-n as well where applicable.

Mobile App (Foxxvault App) and User Interface:

Referring now to FIGS. 1 and 15-20, the mobile application 44a-n (FIG. 1) may be downloaded onto the user's mobile devices 42a-n over the mobile communications network 52. Using mobile device 42a for example, certain aspects of the mobile app 44a may be presented to the user on the mobile device through a graphical user interface (GUI) 46a. On the home screen illustrated in FIG. 16, the GUI displays a vehicle tracker 200 depicting the vehicle location (and/or key fob location) on a map display. The GUI further displays a lock status button 202 that provides a visual lock status indicator 204. In addition, the lock status button 202 may be selected on the GUI to transmit a wireless lock or unlock signal from the mobile device 44a to a selected and authorized security vault 32 to disengage the latch 48 from the main vault housing 70 and release the door plate 72 so the user may access the compartment 36. Alternatively, the lock status button 202 may be used to engage the latch 48 when disposed within the latch receptacle 98 to secure door plate 72 to the main vault housing 70 and seal off the internal compartment 36 and any contents stored therein such as the keys/key fob 38. A battery level indicator 206 may also be displayed below the lock status button 202 on the home screen 46a indicative of the battery level of the batteries 110 stored in the removable module 106. Below the battery status indicator 206 is a key presence indicator 208 that indicates whether or not a key fob is currently located within the compartment 36. At the bottom of the GUI 46a is a vehicle request button 210 wherein a user may select to initiate a vehicle request process.

Figure 17:
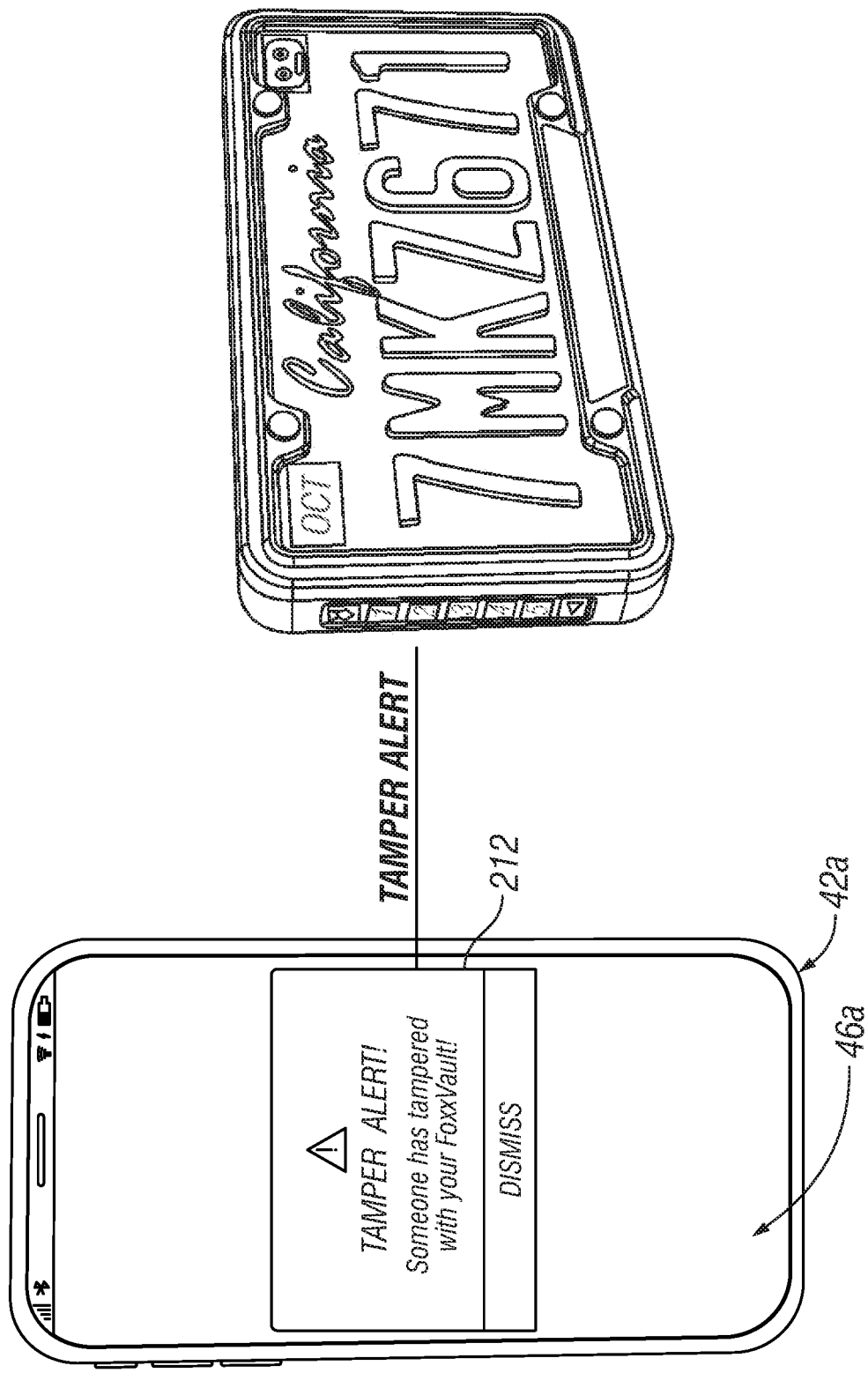
FIG. 17 is an alternative exemplary screen shot of a mobile application graphical user interface for use with the vehicle security vault system of FIG. 1.

As further shown in FIG. 17, based on feedback from the accelerometer 118 (FIG. 14), a tamper alert 212 may be displayed on the GUI 46a. This may occur if the vehicle is in an accident or someone tampers with the security vault 32 by trying to remove the vault from the vehicle frame 34 or pry open the door plate 72.

Figure 23:
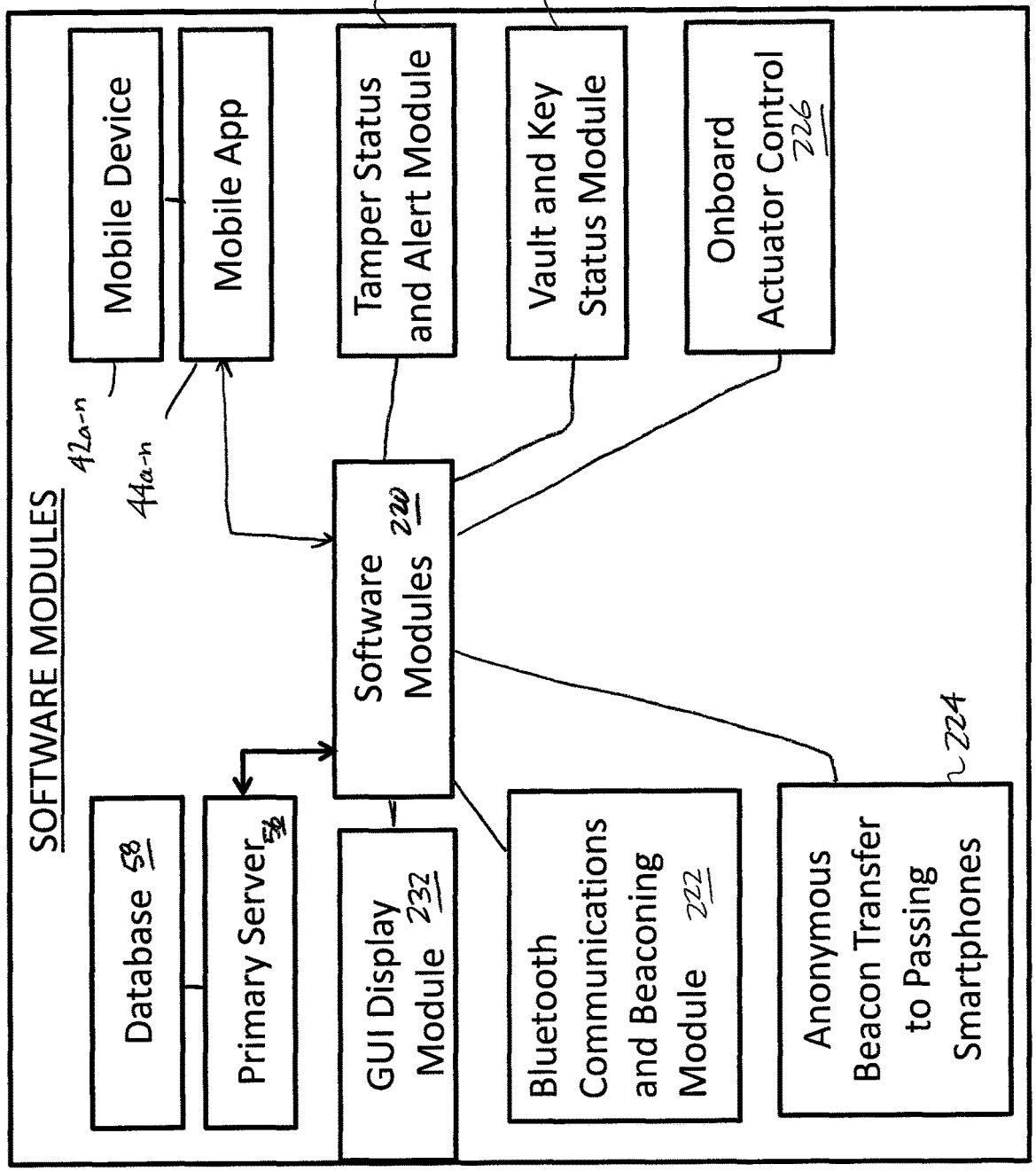
FIG. 23 is a schematic block diagram of a set of exemplary software components for use with the license plate vault system in accordance with the principles of the present invention.

Software Components:

Referring now to FIG. 23, the software components or modules 220 in the form of programmed instruction sets that are accessible for processing by the mobile app 44a or the primary server 56 along with the database elements as illustrated in FIG. 15 include a Bluetooth communications and beaconing module 222, an anonymous beacon transfer module 224, an onboard actuator control module 226 for locking/unlocking the latch 48, a vault and key fob status module 228, a tamper status and alert module 230, and a GUI display module 232. Each of the modules may be available as resident software in the mobile device 42a or primary server 56, downloadable components into such devices, or otherwise remotely accessible over the communications network 52.

The Bluetooth communications and beaconing module 222 is responsible for handling communications between the Bluetooth LE chip 112, the beacon 40 and the primary server 56 and one or more mobile devices 42a-n. The anonymous beacon transfer module 224 is responsible for handling communications (e.g. signals or announcements) between the beacon 40 and one or more mobile devices 42a-n passing by in beacon mode to provide updates regarding the position of the vault 32 and/or key fob 38. The onboard actuator control module 226 communicates with one or more mobile devices 42a-n, primary server 56, and/or microcontroller 114 to actuate the motor 99 to engage or disengage the latching mechanism 95 with the latch 48. The vault and key fob status module 228 communicates with the key presence sensor 37 and latching mechanism 95 or onboard actuator control module 226 to issue signals corresponding to the presence of a key or key fob within the compartment 36 and the locked or unlocked status of the door plate 72. These status signals may be relayed to the primary server 56 or one or more mobile devices 42a-n. The tamper status and alert module 230 communicates with the accelerometer 118 and issues a tamper alert signal that may be displayed as a tamper alert 212 (FIG. 17) on a user's GUI 46*a*. It will be appreciated that the microcontroller may contain the logic, either in the form of firmware, software, or electronic circuitry, or a combination thereof to process signals from the sensors 37, 40, and latch position sensor or door open/closed sensor and pass them on to the GUI display module 232, which in turn relays display signals to the GUI 46*a* for display, including those display elements shown in FIGS. 16-17 and 20-21.

Exemplary Uses of the Vehicle Security Vault System:

It will be appreciated that the SSV 30 (FIG. 1) may be used for tracking a vehicle 34 and/or a set of keys/key fob 40, providing a secure key transfer with or without the vehicle owner being present, determining the locked status of the security vault 32, positively verifying the presence of a key set/fob within the vault, and determining whether the vault has been tampered with, among other processes. Examples of such processes are discussed below in more detail.

Figure 18:
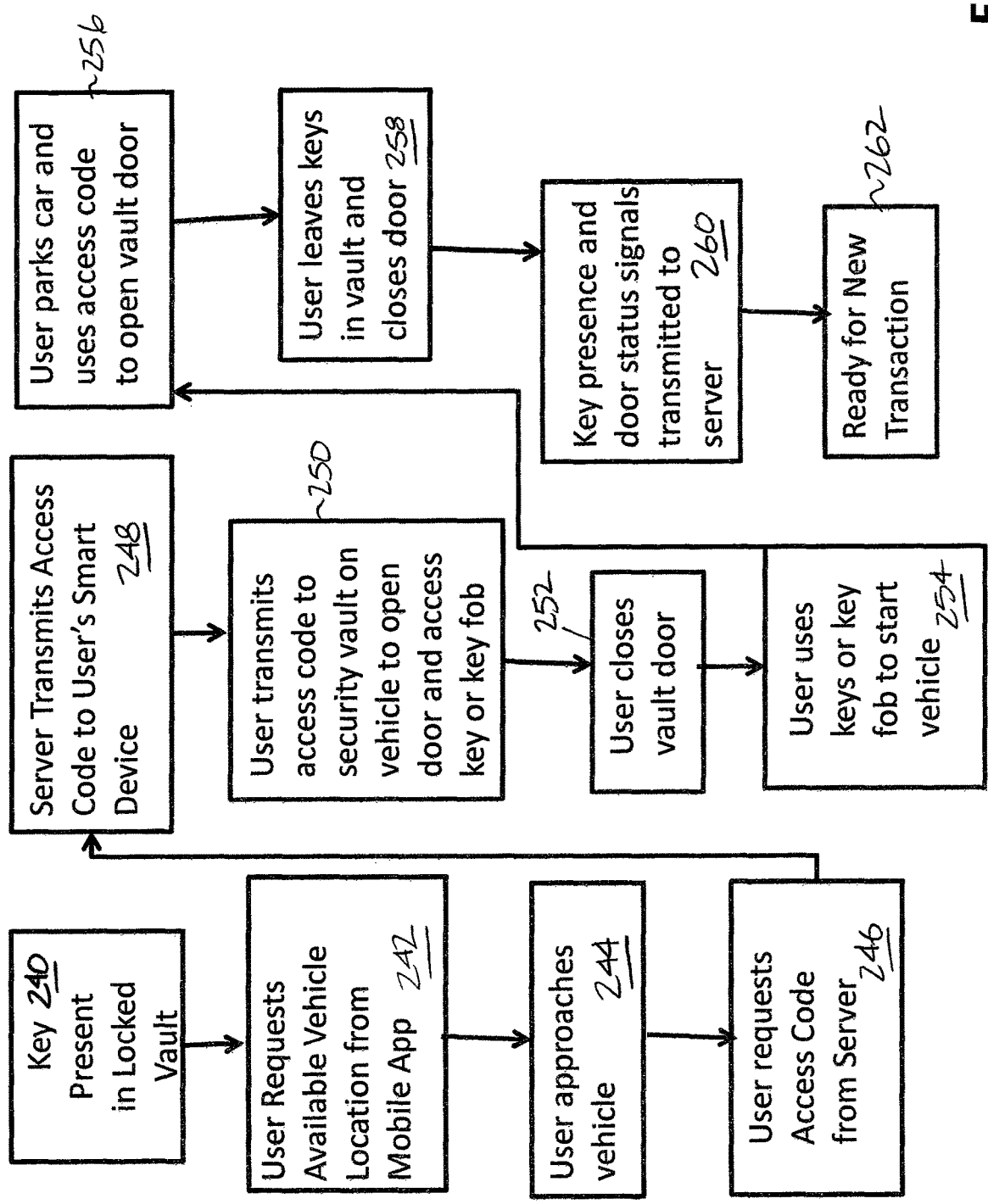
FIG. 18 is a block diagram illustrating an exemplary process that may be used with the vehicle security vault system of FIG. 1.

Referring now to FIGS. 1 and 16-21, an exemplary process for locating a vehicle and/or key fob will now be explained followed by an exemplary process for securely transferring a set of keys or key fob for gaining entry to a corresponding vehicle. Turning to FIG. 18, at step 240 the assumption is that a set of keys with a key fob 38 is stored within the compartment 36 of the security vault 32 with the door plate 72 closed and the vault is secured to the frame 34 of a particular vehicle as shown in FIG. 2 for example. At this point, the security vault 32 has transmitted to the primary server 56 and/or one or more mobile devices 42*a-n* via its antenna 50 that the keys 38 are present within the compartment 36 of the vault 32 and that the vault is locked. The key present status 208 and door locked status 204 may be displayed on the GUI 46*a* such as that shown in FIG. 16 for example. This process also assumes that at least one user has already registered with the SSV 30 and has associated user information 172 stored in the database 58. Vehicle, key fob, and vault related information are also stored in the database.

Figure 21:
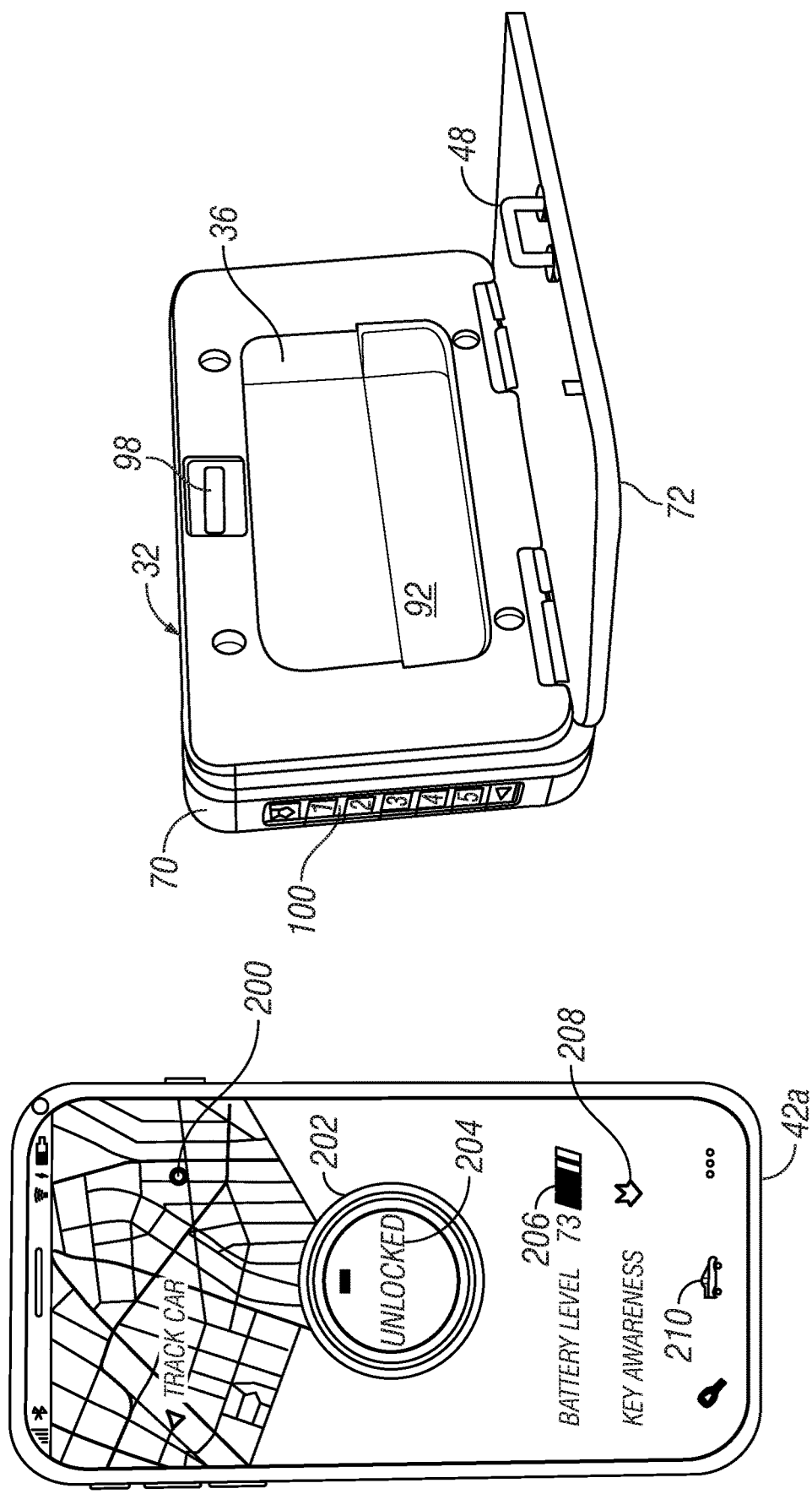
FIG. 21 is a schematic diagram similar to FIG. 20 with the security vault in an open configuration after receiving an unlock command.

With continued reference to FIGS. 1 and 18, at step 242, the user with the mobile device 42*a* requests the location of a vehicle 34 available for use by selecting the vehicle icon 210 on the GUI 46*a* of the mobile device using the mobile app 44*a*. This vehicle request is transmitted from the mobile device 42*a* to the primary server 56 over the mobile communications network 52. The information relayed includes the location of user via an onboard GPS chip calculation in the mobile device 42*a* and a preferred location range. The primary server then accesses the database 58 to determine a set of one or more vehicle locations 178 (FIG. 15) and transmits a list of vehicles within the preferred range to the user's mobile device 42*a* in which keys 38 are indicated as present and ready for transfer. The user selects a vehicle within the range from the list and locates the vehicle using the tracking display 200 feature on the GUI 46*a* (step 244). The tracking display features may provide a map of the vehicle and/or a list of directions to the vehicle. After arriving at the vehicle, using a mobile device 42*a*, the user may request an access code 162 (FIG. 15) associated with the security vault 32 (step 246). The primary server 56 receives the request from the mobile device 42*a* over the mobile communication network 52 and accesses the database 58 for the corresponding access code 162. The primary server transmits the access code 162 to the user's mobile device 42*a* (step 248). The user may then transmit the access code 162 to the security vault 32 by selecting the unlock button 202 (FIG. 16) on the GUI 46*a* (step 250). As shown in FIG. 20, the mobile device 42*a* fitted with wireless communication capabilities transmits a wireless unlock signal 251 to the security vault 32. This wireless unlock signal is in turn is received by the antenna 50 in the module 106 and confirmed by the microcontroller 114 as indicated by waves 253 in FIG. 20. Once the unlock signal and access code are confirmed, the microcontroller 114 sends a signal to the actuator 116 which triggers the motor 99 to disengage the latching mechanism 95 from the latch 48 of the door plate 72 (still at step 250). It will be appreciated that the user may grasp the upper end of the door plate 72 and rotate the door plate 72 about the respective hinge sets 97*a*, 144*a*, 158*a*, and 97*b*, 144*b*, and 158*b* to access the compartment 36 concealed behind to retrieve the key set 38 stored therein. In addition, the hinge sets may be biased outwardly so that the door plate springs open when unlocked by a command from the mobile device 42*a*. The open configuration with the door plate 72/license plate 76/vanity frame 74 unit rotated away from the main vault housing 70 is shown in FIG. 21. After the user retrieves the key set or key fob 38 (FIGS. 1, 13, 22) from the compartment 36, 36*b* (step 250), the user may simply rotate the door plate 72 to dispose the latch 48 within the latch receptacle 98 (step 252). Locking may be automatic once the latch is disposed with the latch receptacle. Alternatively, the user may engage the lock using lock button 202 on the GUI 46*a* of the mobile device 42*a*. The user may then open and start the vehicle in a traditional manner and drive the car to a desired destination (step 254). Once the user parks the car and has finished with the vehicle at step 256, the user may then unlock the security vault 32 again using the GUI 46*a* lock button 202 (step 256). The user may then place the keys/fob 38 back into the compartment 36 and close the door plate as above (step 258). The key presence sensor 37 verifies the key within the compartment 36 and the status of the lock. A key presence signal and lock status signal are transmitted to the primary server 56 from the security vault 32 over the mobile communications network 52 (step 260). The database 58 is updated accordingly by the primary server 56 and the vehicle stands ready for another transaction (step 262). It will be appreciated that the entire process may take place without the vehicle owner present as the transfer may be controlled remotely over the mobile communications network. Only those users with a valid permission 170 (FIG. 15) and access code may open the vault 32 and retrieve the keys 38. While the user may open the vault using a mobile device 42*a* in communication with the vault 38, the primary server may also override or open the vault remotely over the mobile communication network 52 as the vault is placed in communication with both the mobile devices and the primary server. Should the batteries 110 in the vault 32 fail, the vault remain in a locked state. However, the user may be supplied with an alternative access code to open the door plate 72 and access the vault 32 using the manual door lock buttons 104 (FIG. 2).

Should the vehicle 34 be impacted or a person attempt to remove the vault 32 from the vehicle 34 or pry the door plate 72, the accelerometer 118 (FIG. 14) will issue a signal to the microcontroller 114, which in turn will relay a signal to the user's mobile device 42*a* resulting in a tamper alert 212 on the GUI 46*a*. This feature aids in alerting a user that a license plate, vault, or key theft may be occurring.

Figure 19:
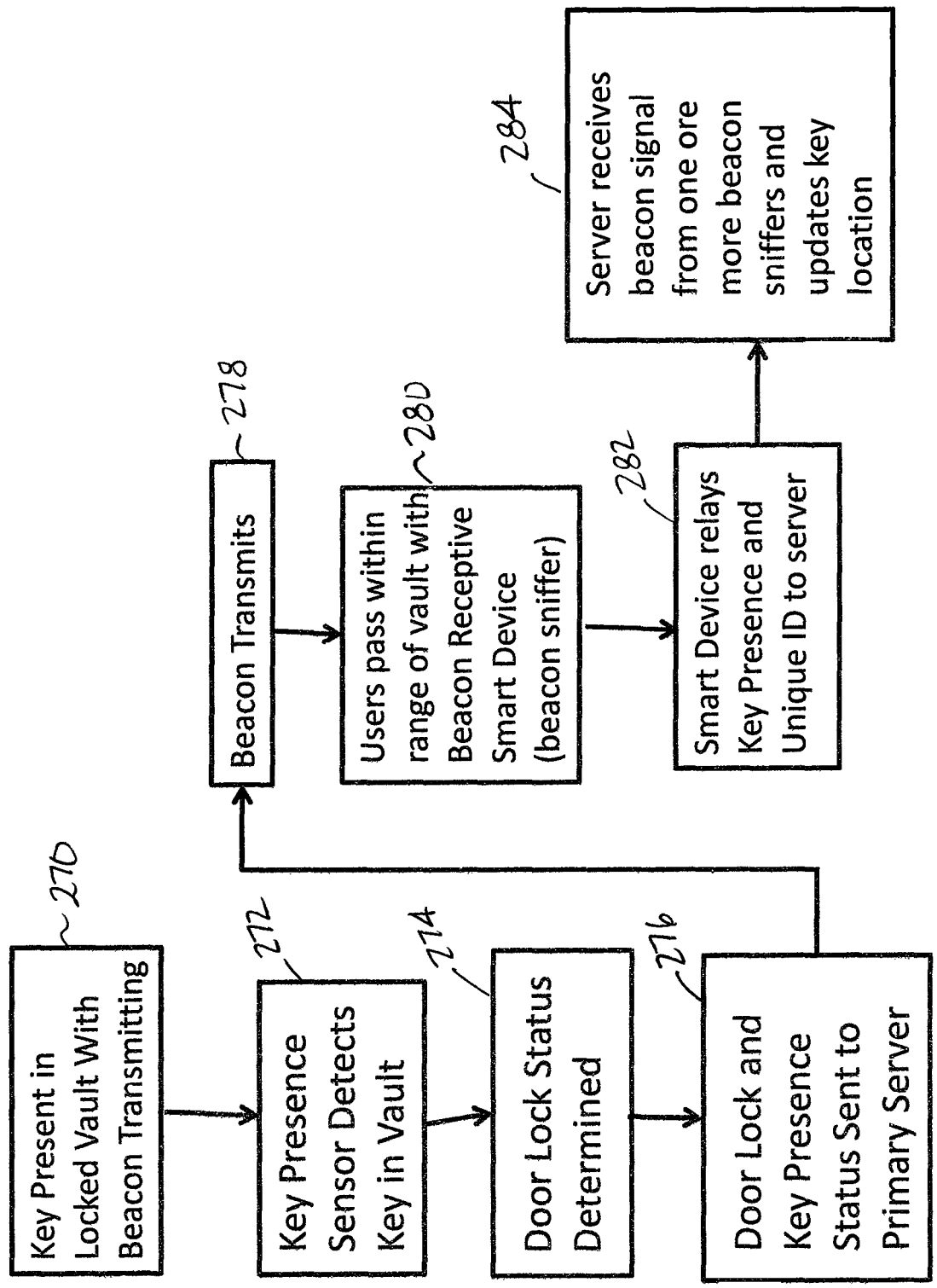
FIG. 19 is a block diagram illustrating another exemplary process that may be used with the vehicle security vault system of FIG. 1.

Turning now to FIG. 19, a process for updating the location of a vehicle 34, vault 32 and/or key fob 38 are detailed. In this example, the key fob 38 includes a beacon device 40 both of which are initially assumed to be located within the compartment 36 of a security vault 32 (step 270).

The key presence sensor 37 (FIGS. 1, 14) detects that a key fob is within the compartment 36 (step 272). The door lock sensor (motor or latching mechanism position) detects that the vault 32 is locked (step 274). Both key present and locked status signals are relayed to the microcontroller 114 (step 276). In addition, a continuous or periodic beacon signal is transmitted or announced by the security vault 32 over the antenna 50 (step 278). When a user with a mobile device 42a (beacon sniffer or detector) passes within a particular range (step 280) determined by the beacon and has a beacon application (separate app or part of mobile app 44a) turned on and open to receiving a beacon signal from the security vault, the mobile device 42a receives the beacon signal and in turn relays the beacon signal, which contains the unique ID 164 of the key fob 38 and location 178 of the security vault 32 or vehicle 34, to the primary server 56 over the mobile communication network 52 (step 282). At this point, the presence of a particular key fob 38 is positively known within a particular security vault 32 along with the location of the key fob 38. This information may be used by the primary server 56 to update the database 58 (step 284). Should the key fob 38 contain or be coupled to a beacon 40, then the same process may be used for locating the keys, inside or outside the vault 32.

It will be appreciated that this beaconing process may be known by the user or anonymous to the users as they pass by with the beacon responsive mobile devices, depending on the beacon settings in the mobile app 46a. Each time a user passes by the vehicle where the key fob 38 in communication with a beacon 40 is stored, a more precise location of the key fob is known. In addition, the presence of the key fob within the vault 32 ensures the location of the vehicle as well. As the beacon technology uses a much more narrow range than a GPS chip and may be updated more frequently by a crowd of passersby, a more precise location may be determined. This approach also does not require the actual vehicle owner to be present to determine the location of the vehicle or relay an information signal. Another advantage is that a key fob sending out a beacon signal in conjunction with a security vault transmitting a key not present signal indicates that the key fob is not necessarily near the vehicle and is certainly not securely locked in the vault 32.

Figure 24:
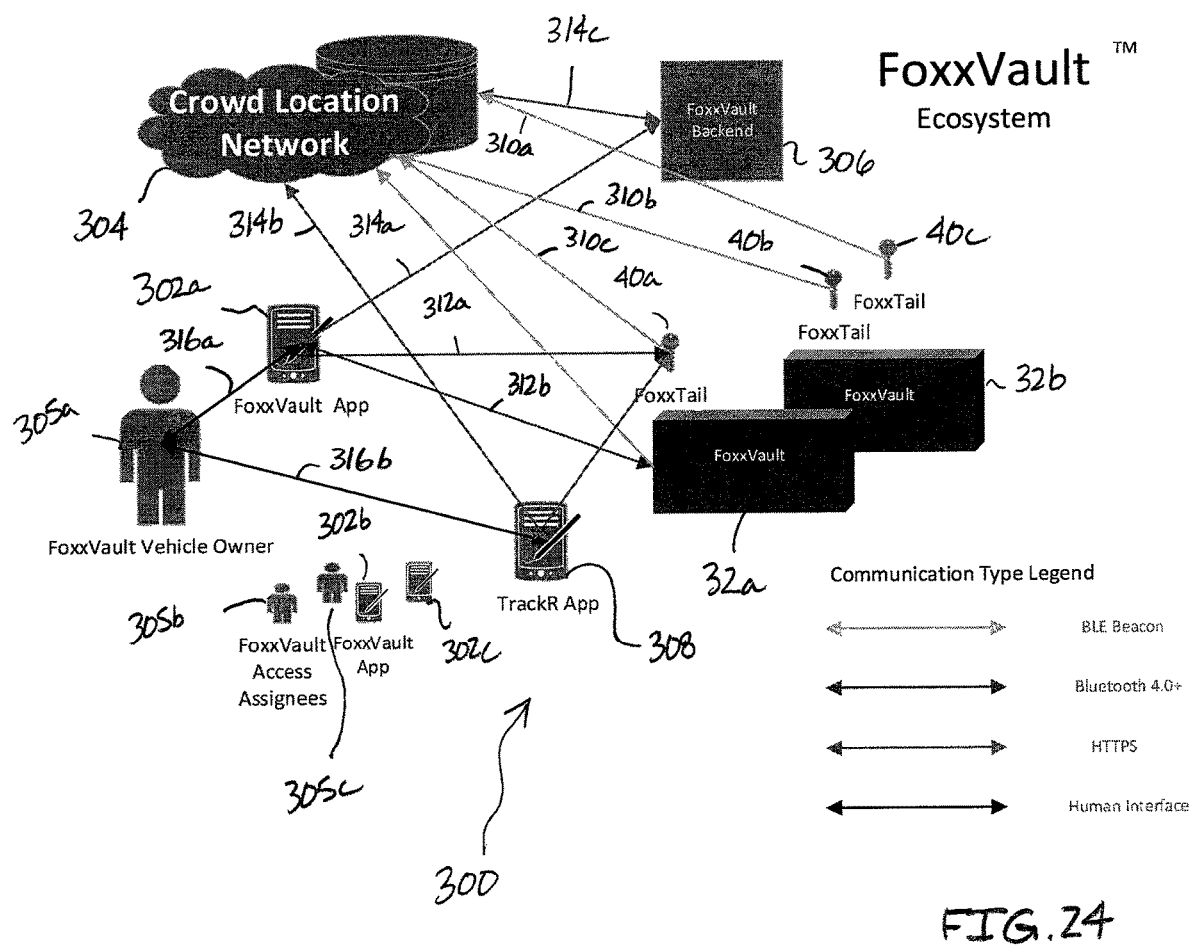
FIG. 24 is a schematic block diagram of an exemplary beaconing and crowd location system for use with the system of FIG. 1.

Referring now to FIG. 24, a schematic diagram of an exemplary beaconing system, generally designated 300, implementing a crowd location network effect to assist in locating a vehicle, key set, or security vault is illustrated. As shown in FIG. 24, the implementation of the beaconing capability is provided by one or more enabled smartphones 302a, 302b, 302c, together forming part of a Crowd Location Network (CLN) 304 in communication over the mobile communications network 52 (FIG. 1). Each mobile device 302a-c is associated with a user 305a-c and has a mobile app (such as the Foxxvault app) receptive to beacon signals. This allows for frequent transmission of the status of one or more security vaults 32a, 32b (or key sets) through anonymous data reporting by millions of users 305a, 305b, 305c, while consuming minimal power requirements for the security vault through the use of one or more low energy beacons 40a, 40b, 40c in communication with both a corresponding security vault 32a, 32b, or a key set 38 (FIG. 1) and the Crowd Location Network 304 such as over BLE beacon comm lines 310a-c. The beacon signals, and their associated information, may be gathered by and coordinated by a central tracking app 308, which may be on a user device 302a, for example, or a standalone app or program on another device in the network. The tracking app may communicate with the CLN over an HTTPS comm line 314b while the Foxxvault app (such as mobile app 44a in FIG. 1) communicates with the backend app 306 located on the primary server 56 (FIG. 1) over HTTPS comm line 314a. A user, such as the vehicle owner 305a or vehicle administrator may interface with the Foxxvault app on user device 302a via human interface 316a to conduct activities described herein or interface with the tracking app 308 over human interface line 316b to determine the location of a requested vehicle or vehicles matching the user's requirements, such as when initiating a key transfer process. It will also be appreciated that the mobile device 302a may also communicate directly with a beacon device 40a over a Bluetooth 4.0+ comm line 312a or the security vault 32a, for example, over a Bluetooth 4.0+ comm line 312b.

Such crowd information may be used to update the database 58 elements, such as the exemplary data shown in FIG. 15, regarding positive key fob presence, battery state/levels, state of vault (locked or unlocked), tampering indications based on accelerometer detection and of course GPS location because of the location of the GPS enabled smartphone passing the anonymous beacon from the license vault to the Crowd Location Network 304. The Crowd Location Network information may be stored in the database 58 and made accessible by a backend application 306 implemented in the SSV 30. This information is then made available to an authenticated user through normal mobile application HTTPS access through communication lines 314a-c taking place between the Foxxvault backend app 306 on the primary server 56 (FIG. 1) over comm line 314a, the CLN 304 and tracking app 308 (comm line 314b), and Foxxvault app on user device 302a, and Foxxvault backend app and the CLN (comm line 314c). Overall, the influx of frequent crowd updates regarding and confirming the status of the vaults, key presence, and vehicle location over a large scale network, all from users passing by security vaults or key sets with tracking tiles, tags, or beacons will greatly aid in tracking and handling a large number of secure key transfers and associated vehicle sharing activities.

It will be appreciated that the security vault 32 fits virtually every vehicle type, is easy to install, and provides a secure method for preventing license plate theft and storage of a key or fob. Such solution accommodates vehicle owners leaving a car at an airport or a location for someone else to pick-up the car. Such solution further allows a user to keep the keys with the vehicle to avoid losing at another location. Along those lines, those involved in outdoor sports may avoid losing keys while hiking, boating and surfing, by leaving the keys in vault. In addition, the enlarged compartment space accommodates other objects such as phones, wallet, electronic devices, jewelry, and other valuables. It will be appreciated that the mobile device is not necessary since the manual combination may be used in these instances if the mobile device is stored in the vault.

While the foregoing security vault embodiments have mainly been described in terms of an after-market add-on to a conventional vehicle, preferably mounted to a portion of the vehicle normally dedicated to mounting a licensing plate, it will be appreciated that the security vault may also be part of an OEM build with either the security vault built directly into the frame of the vehicle or the vehicle modified to receive a security vault at a location other than the license plate area with the security vault still remaining accessible outside the vehicle.

In addition, another plate, similar in construction to the door plate but transparent, may be sandwiched between the vanity frame and the outer facing surface of the license plate 76 to prevent access to the license plate tags as an alternative security enhancement.

In view of the foregoing, some of the objects supported by one or more embodiments described herein and constructed in accordance with the present invention are to provide a way to prevent license plate theft; to provide a secure storage compartment for a set of vehicle keys and other valuables in a discreet/inconspicuous location to facilitate a secure key transfer in support of vehicle sharing activities; to positively report the presence of a key or key fob within a secure storage compartment attached to a vehicle; and/or to provide a primary lock and a backup fail safe lock for the secure storage compartment.

Another object of the present invention to incorporate a crowd locating feature in conjunction with a beaconing technology so that anonymous vehicle location updates may be gathered from a group of users passing by the vehicle.

Certain objects and advantages of the invention are described herein. These and other objects of the invention, as well as many of the intended advantages thereof, will become more readily apparent when reference is made to the accompanying description taken in conjunction with the accompanying figures with the understanding that the embodiments described herein may satisfy one or more of the objectives. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure.

It is also contemplated that various combinations or sub-combinations of the specific features and aspects of the embodiments may be made and still fall within the scope of the invention. Accordingly, it should be understood that various features and aspects of the disclosed embodiments may be combined with or substituted for one another in order to form varying modes of the disclosed invention. Thus, it is intended that the scope of the present invention herein disclosed should not be limited by the particular disclosed embodiments described above.

What is claimed is:

1. An anti-theft license plate display and secure storage device comprising:
   a security vault including a housing constructed to mount on a portion of a vehicle frame and inhibit removal therefrom, the security vault further including a cover cooperating with the housing to define a storage compartment constructed to secure at least one vehicle access component when stored therein with the cover locked by a locking element, the security vault further including a first sensor constructed to detect the presence of a vehicle access component disposed within the storage compartment and generate a vehicle access component presence status signal;
   a powered communication interface in communication with the security vault, the locking element, and the first sensor, the communication interface being operable to transmit a security vault location signal, a locking element status signal, and the vehicle access component presence status signal to a location outside of the security vault, the communication interface further being operable to receive at least an authenticated unlocking command from a remote location outside the security vault to unlock the locking element releasing the cover at least partially from the housing allowing a user to access the storage compartment and retrieve a vehicle access component when stored therein; and
   a beacon in communication with the first sensor or powered communication interface, the beacon constructed to periodically or continuously announce the vehicle access component presence status to a location outside the security vault for receipt by a mobile communication device passing within a predetermined range of the security vault.

2. The device of claim 1 further including:
   a vanity frame coupled to the cover and sandwiching a license plate therebetween; and
   a first set of fasteners securing the housing to the vehicle frame and inaccessible when the cover is locked to the housing.

3. The device of claim 1 further including:
   an actuator controlled by the communication interface to release the locking element.

4. The device of claim 1 wherein:
   the beacon is constructed to communicate over a Bluetooth or near field communication protocol with one or more mobile communication devices within the predetermined range and set to receive beacon signals.

5. The device of claim 1 wherein:
   at least a portion of the storage compartment includes a Faraday cage wherein the vehicle access component may be placed to shield the vehicle access component from wireless hacking signals outside the security vault while still allowing the first sensor to detect the presence of the vehicle access component within the storage compartment.

6. The device of claim 1 further including:
   a window covering at least a portion of storage compartment, the window being constructed to illuminate when the cover is released from the housing.

7. The device of claim 1 wherein:
   the security vault is issued a unique ID.

8. The device of claim 1 further including:
   a power source energizing the communication interface and the beacon.

9. The device of claim 1 further including:
   an electronics module inaccessible within the security vault when the cover is locked while removable when the cover is unlocked, the electronics module including an antenna for receiving and transmitting signals to and from the communication interface, a power source, a microcontroller, a near field communication chip, and at least a portion of the first sensor.

10. The device of claim 1 further including:
    an auxiliary access interface available on the security vault and constructed to allow a user to release the locking element in the event that the communication interface fails.

11. The device of claim 10 wherein:
the auxiliary access interface is a set of combination push buttons.

12. The device of claim 1 further including:
a second sensor in communication with the communication interface, the second sensor being constructed to detect an event indicative of tampering with the security vault; and
the communication interface being operable to transmit a tampering event signal to a remote location outside the security vault.

13. The device of claim 1 wherein:
the first sensor is an electromagnetic sensor constructed to detect the presence of a vehicle access component stored within the storage compartment of the security vault.

14. The device of claim 2 wherein:
the vanity frame includes an exchangeable plug to alter the appearance of the vanity frame.

15. The device of claim 1 wherein:
the beacon is constructed to announce the vehicle access component presence status, a unique ID of the security vault, the location signal of the security vault, and the locking status signal to one or more beacon sniffers within a predetermined range wherein the status and signals may be passed on to a central server anonymously and provide a set of more accurate location information compared to a GPS signal.

16. The device of claim 1 wherein:
the unlocking command received by the communication interface is an access code.

17. The device of claim 1 wherein:
the communication interface includes a successful unlocking command indicator visible on the exterior of the security vault.

18. The device of claim 1 wherein:
the cover is pivotally coupled to the housing.

19. An anti-theft license plate display and secure storage system for authorizing a vehicle access component exchange over a large scale network including one or more mobile communication devices having a user interface, the system comprising:
a lockable security vault constructed to mount on a portion of a vehicle frame and inhibit removal therefrom, the security vault defining a storage compartment constructed to contain at least one vehicle access component while secured by a locking element, the security vault further including a first sensor constructed to detect the presence of a vehicle access component disposed within the storage compartment and generate a vehicle access component presence status signal;
a powered communication interface in communication with the security vault, the locking element, and the first sensor, the communication interface being operable to transmit a security vault location signal, a locking element status signal, and the vehicle access component presence status signal to a location outside of the security vault, the communication interface further being operable to receive at least an authenticated unlocking command from at least one mobile communication device to unlock the locking element allowing access to the storage compartment and the vehicle access component stored therein;
a beacon in communication with the first sensor or communication interface, the beacon constructed to announce at least the vehicle access component presence status to one or more mobile communication devices passing within a predetermined range of the security vault;
a database constructed to store at least a unique ID for each security vault and an associated unlocking command; and
a primary server with a processing device and a memory unit with one or more software modules, the primary server being in communication with the database and the lockable security vault over the network, the primary server being programmed to, in response to a request for a security vault location from a mobile communication device, provide the location of a security vault generating a vehicle access component status signal indicating the presence of a vehicle access component stored in the storage compartment of the associated security vault with the location of the security vault being based on one or more announcements from the associated beacon relayed by one or more mobile communication devices to the primary server, and access the database to retrieve the unlocking command associated with the unique ID of the located security vault, and transmit the unlocking command to the mobile communication device making the request wherein the mobile communication device may be used to unlock the security vault to access the vehicle access component stored therein.

20. A method of performing a secure vehicle access component transfer comprising:
providing a security vault with a unique ID and including a housing securely mounted on a portion of a vehicle frame, the security vault further defining a lockable storage compartment securing at least one vehicle access component therein by a locking element, the security vault further including at least one sensor constructed to detect the presence of a vehicle access component disposed within the storage compartment and generate a vehicle access component presence status signal;
providing a powered communication interface in communication with the security vault, the locking element, and the at least one sensor, the communication interface being operable to transmit a security vault location signal, a locking element status signal, and the vehicle access component presence status signal to a location outside of the security vault, the communication interface further being operable to receive at least an authenticated unlocking command from a location outside the security vault to unlock the locking element allowing access to the storage compartment and retrieval of a vehicle access component when stored therein; and
providing a beacon in communication with the at least one sensor or powered communication interface, the beacon constructed to announce the vehicle access component presence status to a location outside the security vault for receipt by a mobile communication device within a predetermined range of the security vault;
securing at least one vehicle access component within the storage compartment and locking the locking element;
transmitting a location of a locked security vault with a unique ID having a vehicle access component stored therein from the communication interface as indicated by a vehicle access component presence status signal issued by the communication interface or beacon;

receiving an authenticated unlocking command at the communication interface taking into account the unique ID of the security vault; and unlocking the locking element to allow access into the storage compartment to retrieve the vehicle access component.

\* \* \* \* \*